US011978598B2

(12) United States Patent
Yang et al.

(10) Patent No.: US 11,978,598 B2
(45) Date of Patent: May 7, 2024

(54) KEYSWITCH STRUCTURE AND LIFT MECHANISM THEREOF

(71) Applicant: DARFON ELECTRONICS CORP., Taoyuan (TW)

(72) Inventors: Chen Yang, Taoyuan (TW); Ling-Hsi Chao, Taoyuan (TW); Shao-Lun Hsiao, Taoyuan (TW); Yu-Chun Hsieh, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/071,533

(22) Filed: Nov. 29, 2022

(65) Prior Publication Data

US 2023/0197372 A1 Jun. 22, 2023

Related U.S. Application Data

(60) Provisional application No. 63/356,558, filed on Jun. 29, 2022, provisional application No. 63/361,375, filed on Dec. 16, 2021.

(30) Foreign Application Priority Data

Oct. 5, 2022 (TW) ................................. 111137775

(51) Int. Cl.
*H01H 13/52* (2006.01)
*H01H 13/02* (2006.01)

(52) U.S. Cl.
CPC .......... *H01H 13/52* (2013.01); *H01H 13/023* (2013.01); *H01H 2013/026* (2013.01); *H01H 2013/525* (2013.01)

(58) Field of Classification Search
CPC ........... H01H 2013/00; H01H 2013/02; H01H 2013/50; H01H 2013/52; H01H 1/12;
(Continued)

(56) References Cited

U.S. PATENT DOCUMENTS 5,278,371 A 1/1994 Watanabe
6,444,933 B1 9/2002 Chun
(Continued)

FOREIGN PATENT DOCUMENTS

CN 2423647 Y 3/2001
CN 202523604 U 11/2012
(Continued)

OTHER PUBLICATIONS

Yang, the specification, including the claims, and drawings in the U.S. Appl. No. 17/989,703, filed Nov. 18, 2022.
(Continued)

*Primary Examiner* — Anthony R Jimenez
(74) *Attorney, Agent, or Firm* — Winston Hsu

(57) ABSTRACT

A keyswitch structure includes a base, a keycap, a lift mechanism and a light-emitting part. The lift mechanism includes a first support, a second support, and a spring structure. The first support and the second support are connected to and between the base and the keycap, so that the keycap can move relative to the base in a vertical direction. The spring structure is a single structural part and is connected to the first support and the second support and drives the first support and the second support to lift the keycap in the vertical direction. The lift mechanism as a whole defines a central space that extends through the whole lift mechanism in the vertical direction. The spring structure does not enter the central space. The light-emitting part is disposed on the base corresponding to the central zone, and emits light to illuminate the keycap.

19 Claims, 30 Drawing Sheets

(58) Field of Classification Search
CPC .......... H01H 1/20; H01H 1/2008; H01H 1/22; H01H 1/221; H01H 1/24; H01H 1/26; H01H 1/268; H01H 1/5844; H01H 5/00; H01H 5/06; H01H 5/18; H01H 13/00; H01H 13/04; H01H 13/14; H01H 13/20; H01H 13/22; H01H 13/26; H01H 13/28; H01H 13/285; H01H 13/50; H01H 13/52; H01H 13/70; H01H 13/7006; H01H 13/705; H01H 13/7065; H01H 13/7073; H01H 13/702; H01H 13/83; H01H 2219/00; H01H 2219/01018; H01H 2219/06; H01H 2219/062; H01H 2003/00; H01H 2003/12; H01H 2003/32; H01H 2003/46; H01H 2003/463; H01H 3/00; H01H 3/02; H01H 3/12; H01H 3/125; H01H 3/30; H01H 3/3042; H01H 3/32; H01H 3/305238; H01H 3/3052; H01H 3/38; H01H 13/02
USPC .......................................................... 200/341
See application file for complete search history.

(56) References Cited

U.S. PATENT DOCUMENTS

| | | | | |
|---|---|---|---|---|
| 9,634,661 | B1 * | 4/2017 | Chen | H03K 17/969 |
| 9,952,682 | B2 | 4/2018 | Zhang | |
| 10,509,482 | B1 | 12/2019 | Tsai | |
| 11,114,260 | B2 | 9/2021 | Li | |
| 11,342,134 | B2 * | 5/2022 | Ruff | H01H 13/7013 |
| 11,721,500 | B2 | 8/2023 | Chang | |
| 2005/0217983 | A1 | 10/2005 | Hsu | |
| 2017/0264294 | A1 | 9/2017 | Li | |
| 2019/0267200 | A1 | 8/2019 | Wu | |
| 2020/0294733 | A1 | 9/2020 | Ruff | |
| 2020/0328044 | A1 | 10/2020 | Chao | |
| 2020/0381190 | A1 | 12/2020 | Ruff | |
| 2020/0395178 | A1 | 12/2020 | Chao | |
| 2020/0402735 | A1 | 12/2020 | Chuang | |

FOREIGN PATENT DOCUMENTS

| | | | |
|---|---|---|---|
| CN | 104299828 | A | 1/2015 |
| CN | 204441139 | U | 7/2015 |
| CN | 205016398 | U | 2/2016 |
| CN | 205487874 | U | 8/2016 |
| CN | 105118723 | B | 11/2017 |
| CN | 107017870 | B | 8/2018 |
| CN | 108962654 | A | 12/2018 |
| CN | 110047677 | A | 7/2019 |
| CN | 110199369 | A | 9/2019 |
| CN | 110379661 | A | 10/2019 |
| CN | 110444429 | A | 11/2019 |
| CN | 209627348 | U | 11/2019 |
| CN | 106887358 | B | 3/2020 |
| CN | 111180233 | A | 5/2020 |
| CN | 111684559 | A | 9/2020 |
| CN | 108206112 | B | 4/2021 |
| TW | 200534312 | A | 10/2005 |
| TW | I246701 | | 1/2006 |
| TW | 201611064 | A | 3/2016 |
| TW | I665701 | B | 7/2019 |
| TW | M603617 | U | 11/2020 |
| WO | 2017/181313 | A1 | 10/2017 |
| WO | 2019/052377 | A1 | 3/2019 |

OTHER PUBLICATIONS

Yang, the specification, including the claims, and drawings in the U.S. Appl. No. 18/081,712, filed Dec. 15, 2022.
Yang, the specification, including the claims, and drawings in the U.S. Appl. No. 18/066,412, filed Dec. 15, 2022.

* cited by examiner

KEYSWITCH STRUCTURE AND LIFT MECHANISM THEREOF

CROSS REFERENCE TO RELATED APPLICATIONS

This application claims the benefit of U.S. Provisional Application No. 63/361,375, filed on Dec. 16, 2021. Further, this application claims the benefit of U.S. Provisional Application No. 63/356,558, filed on Jun. 29, 2022. The contents of these applications are incorporated herein by reference.

BACKGROUND OF THE INVENTION

1. Field of the Invention

The present invention relates to a keyswitch structure, and more particularly to a lift mechanism of a keyswitch structure.

2. Description of the Prior Art

The architecture of the current mechanical keyswitch is mainly to connect the keycap and the base with a lift mechanism, so that the keycap can move up and down relative to the base. The stability of the keycap movement, including the stroke and smoothness of the movement, usually relies on the lift mechanism. Traditionally, the mechanical keyswitch uses a compression spring disposed upright, and the light source may be disposed directly under the compression spring, which allows light to smoothly pass through the hollow portion of the compression spring to illuminate the light-emitting area of the keyswitch.

SUMMARY OF THE INVENTION

An objective of the invention is to provide a lift mechanism for supporting a keycap in a vertical direction. The lift mechanism includes a first support, a second support, and a spring structure. The first support and the second support are connected to each other and are mutually rotatable. The spring structure is a single structural part and is connected to the first support and the second support. The spring structure drives the first support and the second support to lift the keycap in the vertical direction. Therein, the lift mechanism as a whole defines a central space. The central space extends through the whole lift mechanism. The spring structure does not enter the central space. Thereby, in actual applications, the central space can allow light emitted by a light-emitting part to pass through to illuminate the keycap without interference from the spring structure.

An objective of the invention is to provide a keyswitch structure includes a base, a keycap, a lift mechanism, and a light-emitting part. The keycap is disposed above the base in a vertical direction. The lift mechanism includes a first support, a second support, and a spring structure. The first support and the second support are connected to and between the base and the keycap. The keycap is movable relative to the base in the vertical direction through the first support and the second support. The first support and the second support are connected to each other and are mutually rotatable. The spring structure is a single structural part and is connected to the first support and the second support. The spring structure drives the first support and the second support to lift the keycap in the vertical direction. Therein, the lift mechanism as a whole defines a central space. The central space extends through the whole lift mechanism. The spring structure does not enter the central space. The light-emitting part is disposed on the base and within a projection of the central space on the base. The light-emitting part emits light to illuminate the keycap without interference from the spring structure.

These and other objectives of the present invention will no doubt become obvious to those of ordinary skill in the art after reading the following detailed description of the preferred embodiment that is illustrated in the various figures and drawings.

DETAILED DESCRIPTION

In order to design an ultra-low profile keyswitch with significant tactile feedback, the inventors conducted in-depth problem analysis and attempts. For example, the lift mechanism of the keyswitch may be a dual-support mechanism in the form of scissors, butterfly (upright V-shaped configuration) or bat (inverted V-shaped configuration), which also cooperates with a horizontal spring with low overall height that connects the two supports and produces a restoring force to lift the keycap. If the force at the corners of the keyswitch during the lifting and lowering of the keycap without swaying also needs to be balanced, the spring must be set in the central space so that the supports are evenly stressed. However, the inventors found that in such a structural configuration, the space under the keycap would be roughly vertically divided into two portions by the spring, so that it is not easy to dispose a light-emitting part of an illuminated keyswitch structure in the center to directly illuminate the large main light-emitting area of the keycap, or it is difficult for the light to reach some corners of the keycap, which affects the backlight uniformity.

Figure 1:
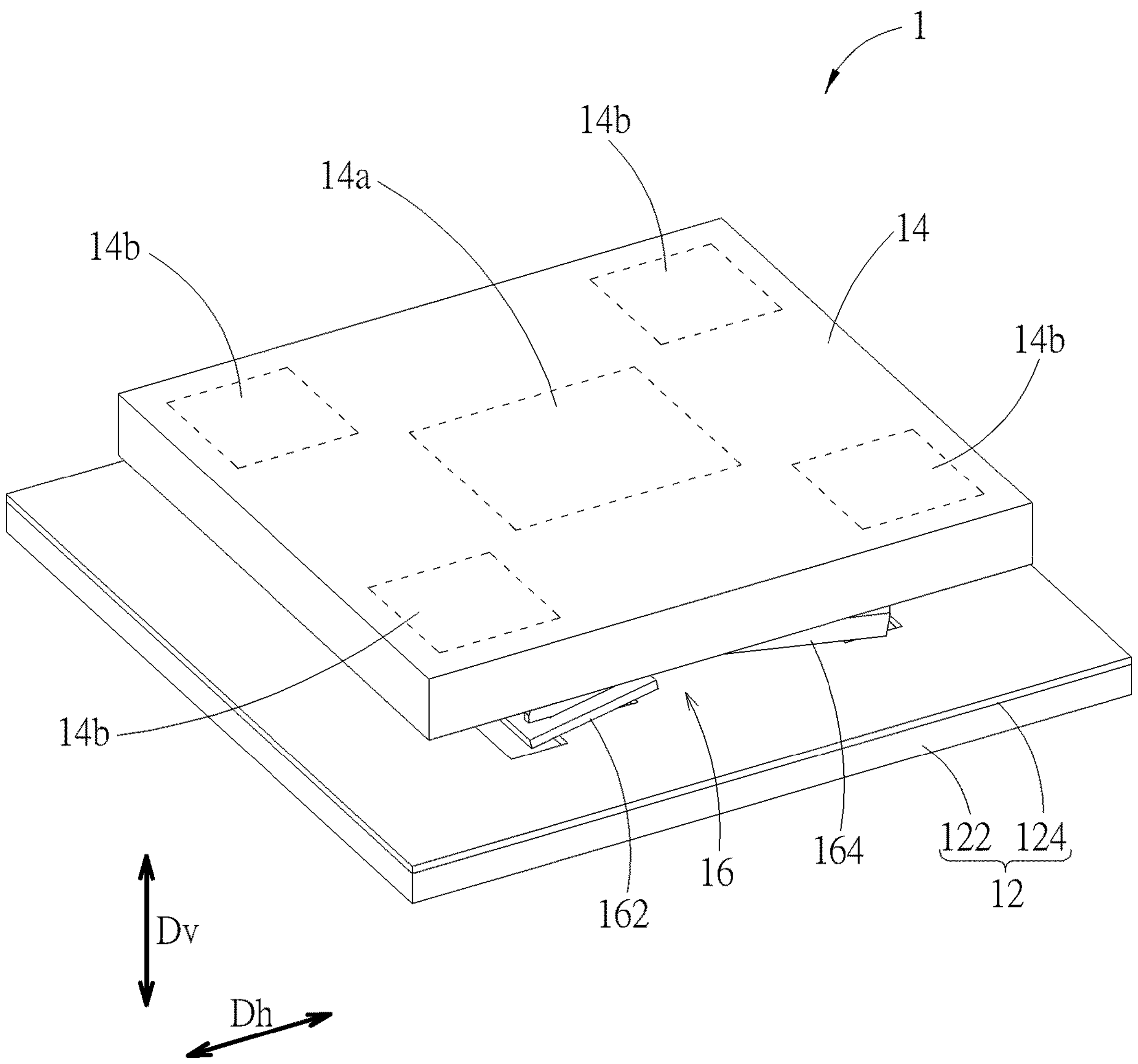
FIG. 1 is a schematic diagram illustrating a keyswitch structure according to a first embodiment.
Figure 2:
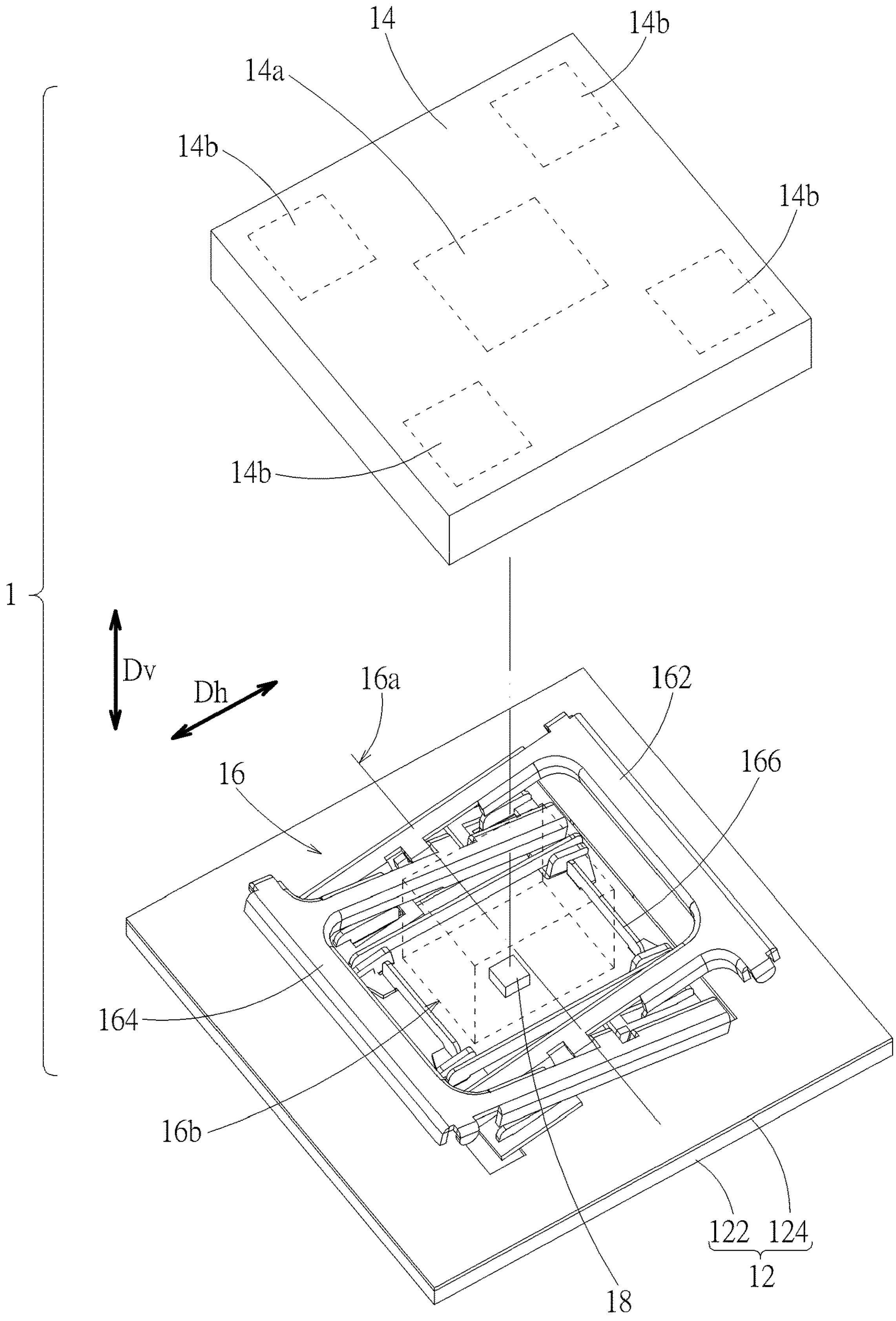
FIG. 2 is a partially exploded view of the keyswitch structure in FIG. 1.
Figure 3:
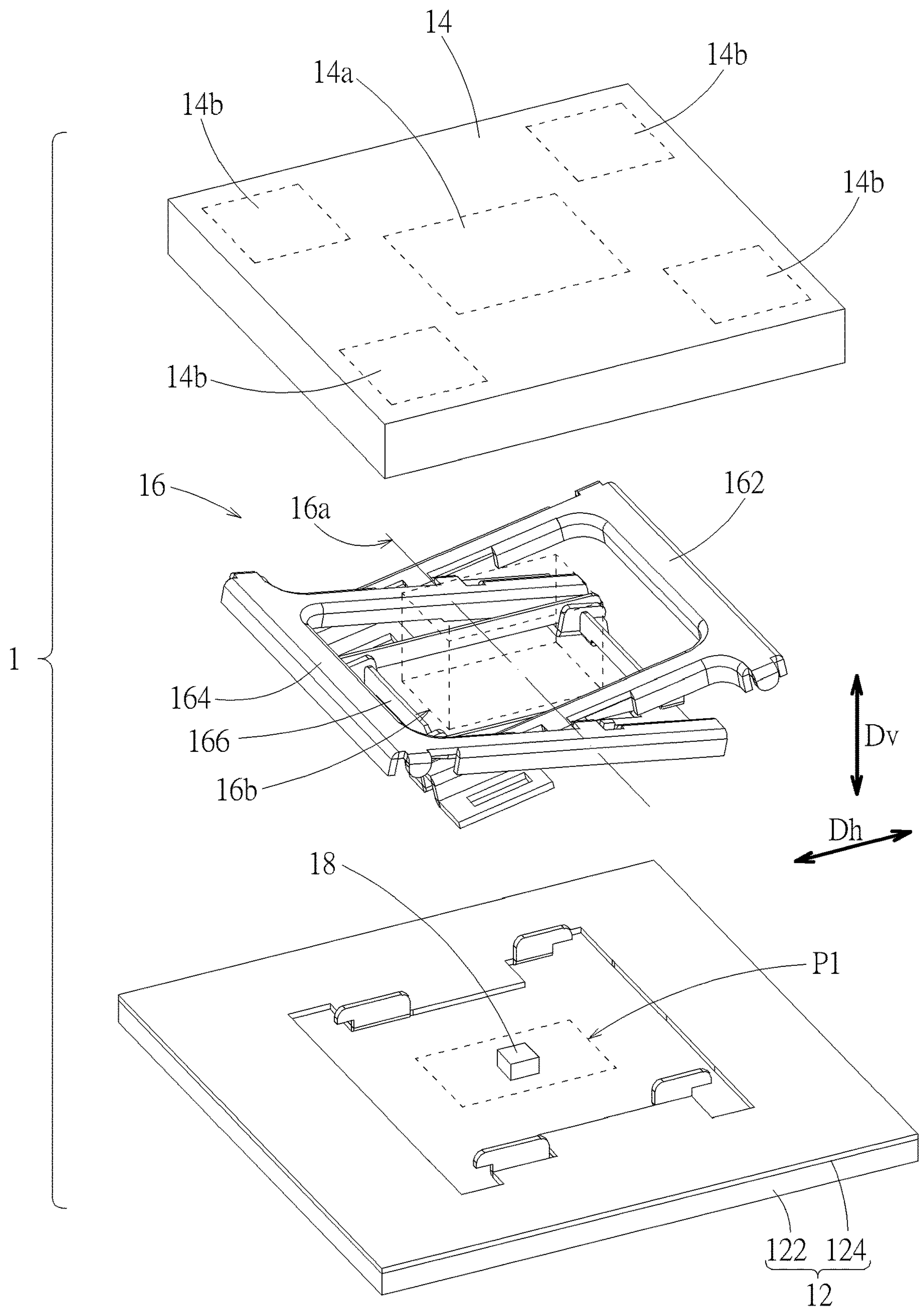
FIG. 3 is another partially exploded view of the keyswitch structure in FIG. 1.

Please refer to FIG. 1 to FIG. 3. A keyswitch structure 1 according to a first embodiment includes a base 12, a keycap 14, and a lift mechanism 16. The keycap 14 is disposed above the base 12 in a vertical direction Dv (indicated by a dual-head arrow in the figures). The lift mechanism 16 is connected to and between the base 12 and the keycap 14, so that the keycap 14 can move relative to the base 12 in the vertical direction Dv through the lift mechanism 16. Therein, the lift mechanism 16 includes a first support 162, a second support 164, and a spring structure 166. The first support 162 and the second support 164 are connected to and between the base 12 and the keycap 14 and can rotate relative to each other, so as to support the keycap 14, so that the keycap 14 can move relative to the base 12 in the vertical direction Dv through the first support 162 and the second support 164. The spring structure 166 is connected to the first support 162 and the second support 164 to provide a restoring force to the first support 162 and the second support 164. The restoring force can drive the first support 162 and the second support 164 to lift the keycap 14 in the vertical direction Dv.

Figure 4:
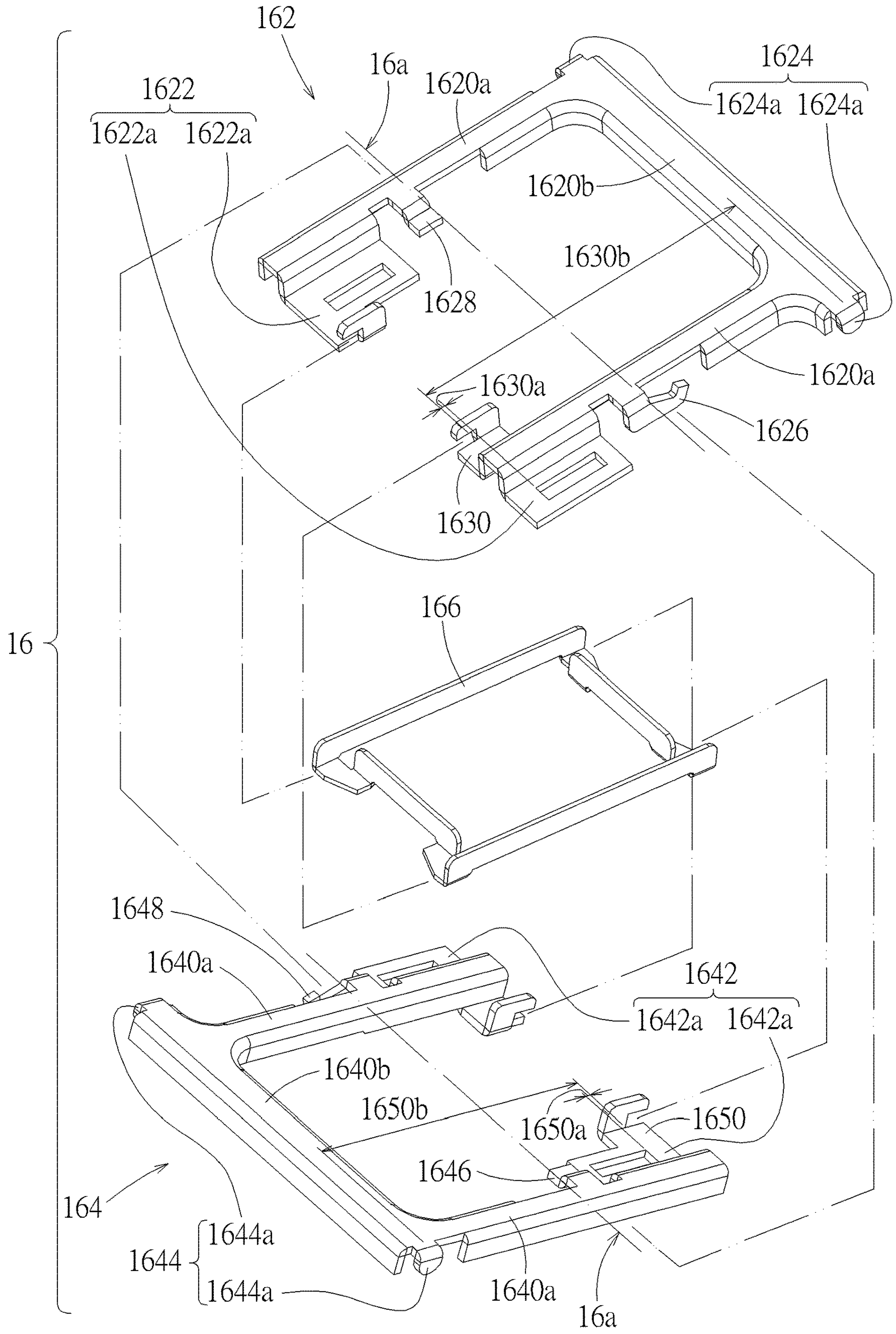
FIG. 4 is an exploded view of a lift mechanism in FIG. 3.

Please refer to FIG. 2 to FIG. 4. In the first embodiment, the first support 162 and the second support 164 are connected to each other, so that the first support 162 and the second support 164 can mutually rotate with respect to a rotation axis **16*a* (indicated by a chain line in the figures). Therein, the first support 162 has a first base connecting portion 1622 and a first keycap connecting portion 1624. The first support 162 is connected to the base 12 through the first base connecting portion 1622 and is connected to the keycap 14 through the first keycap connecting portion 1624. In the first embodiment, the first support 162 as a whole is roughly an n-shaped structure (which includes two side arm portions 1620*a* and a transverse connecting portion 1620*b* connecting the two side arm portions 1620*a*). The first base connecting portion 1622 includes two connecting structures 1622*a* on end portions of the two side arm portions 1620*a*, respectively. The first keycap connecting portion 1624 includes two connecting structures 1624*a* on two end portions of the transverse connecting portion 1620*b*, respectively. Furthermore, the first support 162 also has a first protruding portion 1626 and a third protruding portion 1628 on the middle portions of the two side arm portions 1620*a***, respectively.

Furthermore, the second support 164 has a second base connecting portion 1642 and a second keycap connecting portion 1644. The second support 164 is connected to the base 12 through the second base connecting portion 1642 and is connected to the keycap 14 through the second keycap connecting portion 1644. In the first embodiment, the second support 164 as a whole is roughly an n-shaped structure (which includes two side arm portions **1640*a* and a transverse connecting portion 1640*b* connecting the two side arm portions 1640*a*). The second base connecting portion 1642 includes two connecting structures 1642*a* on end portions of the two side arm portions 1640*a*, respectively. The second keycap connecting portion 1644 includes two connecting structures 1644*a* on two end portions of the transverse connecting portion 1640*b*, respectively. Furthermore, the second support 164 also has a second protruding portion 1646 and a fourth protruding portion 1648 on the middle portions of the two side arm portions 1640*a***, respectively.

As shown by FIG. 2 and FIG. 4, the first protruding portion 1626 and the third protruding portion 1628 of the first support 162 extend below the second support 164 and abut against the second support 164 on the rotation axis **16*a*. The second protruding portion 1646 and the fourth protruding portion 1648 of the second support 164 extends below the first support 162 and abuts against the first support 162 on the rotation axis 16*a*. Thereby, the first support 162 and the second support 164 as a whole is an X-shaped supporting structure. The first support 162 and the second support 164 can be mutually driven and constrained in structure. Furthermore, in the first embodiment, the third protruding portion 1628 of the first support 162 and the second protruding portion 1646 of the second support 164 have the same structure. The fourth protruding portion 1648 of the second support 164 and the first protruding portion 1626 of the first support 162 have the same structure. Hence, the connection relationship between the first support 162 and the second support 164 by the third protruding portion 1628 and the fourth protruding portion 1648 is same as the connection relationship between the first support 162 and the second support 164 by the first protruding portion 1626 and the second protruding portion 1646; however, it is not limited thereto in practice. For example, both sides of the first support 162 are connected to the second support 164 (which has the structure of the second protruding portion 1646 on both sides) by the structure of the first protruding portion 1626. For another example, the third protruding portion 1628 of the first support 162 is replaced with other connecting structure to connect with the second support 164 (of which the fourth protruding portion 1648** is structurally modified accordingly), which will not be described in addition.

Furthermore, in the first embodiment, the first support 162 and the second support 164 have the same structure, which helps reduce the number of parts and manufacturing costs. Furthermore, the first support 162 and the second support 164 may be formed by stamping a metal plate, which can take into account the thinning and structural strength of the supports. However, it is not limited thereto in practice. Furthermore, in the first embodiment, the position where the first support 162 and the second support 164 are connected is between the first/second base connecting portion 1622/1642 and the first/second keycap connecting portion 1624/1644; however, it is not limited thereto in practice. For example, the first/second base connecting portion 1622/1642 is disposed on the middle portion of the side arm portion of the n-shaped structure, and the first/second protruding portion 1626/1646 is disposed on the end portion of the side arm portion of the n-shaped structure. In addition, in the first embodiment, the first support 162 and the second support 164 are connected on both sides of the n-shaped structure (i.e., the side arm portions 1620*a* and 1640*a*); however, it is not limited to thereto in practice. For example, the first support 162 and the second support 164 are connected only on one side of their n-shaped structure. In addition, compared with the supports that are generally pivotally connected to each other by a hole-shaft structure, the first support 162 and the second support 164 use the protruding portions 1626 and 1628 and the protruding portions 1646 and 1648 to extend below each other so as to be mutually driven and constrained in structure. This structural configuration can achieve the mutual pivotal connection between the supports 162 and 164 (i.e., the supports 162 and 164 mutually rotate with respect to the rotation axis 16*a*). Furthermore, since the connection structure between the first support 162 and the second support 164 has no hole-shaft structure, the thickness of the support can be significantly reduced compared with the hole-shaft structure, which is conducive to low-profile designs.

Please refer to FIG. 2 to FIG. 5. The spring structure 166 is single structural part, which means that all portions of the spring structure 166 are directly connected together (i.e., The spring structure 166 has no isolated portions). In practice, the single structure is not limited to be made of the same material, and can also be formed by directly combining a plurality of components of the same material or different materials. In the first embodiment, the spring structure 166 as a whole is a ring-shaped structure; more precisely, the spring structure 166 is a bent plate (such as but not limited to being formed by stamping technology) and has a rectangular structure as a whole. The first support 162 and the second support 164 are connected to approximately the four corners of the spring structure 166. (From the view point of FIG. 5) the four sides of the spring structure 166 extends parallel to and adjacent to the projections of the first support 162 (or the side arm portions 1620*a* and the transverse connecting portion 1620*b* thereof) and the second support 164 (or the side arm portions 1640*a* and the transverse connecting portion 1640*b* thereof). The lift mechanism 16 as a whole defines a central space 16*b* (indicated by a dashed box in FIG. 2, FIG. 3 and FIG. 5), which extends through the whole lift mechanism 16 in the vertical direction Dv. The first support 162 and the second support 164 jointly surround the central space 16*b*. The spring structure 166 does not enter the central space 16*b* and surrounds the central space 16*b*. The spring structure 166 are connected to the first support 162 and the second support 164 in tension, so that the spring structure 166 will drive the first support 162 and the second support 164 to approach each other in the horizontal direction (perpendicular to the vertical direction Dv and the rotation axis 16*a*), thereby lifting the keycap 14. Therein, when the keycap 14 is pressed, the first support 162 and the second support 164 stretch the spring structure 166 in the horizontal direction Dh (so that the plate structure of the spring structure 166 is bent and the structural frame of the spring structure 166 is elastically deformed), as shown in FIG. 6.

Figure 5:
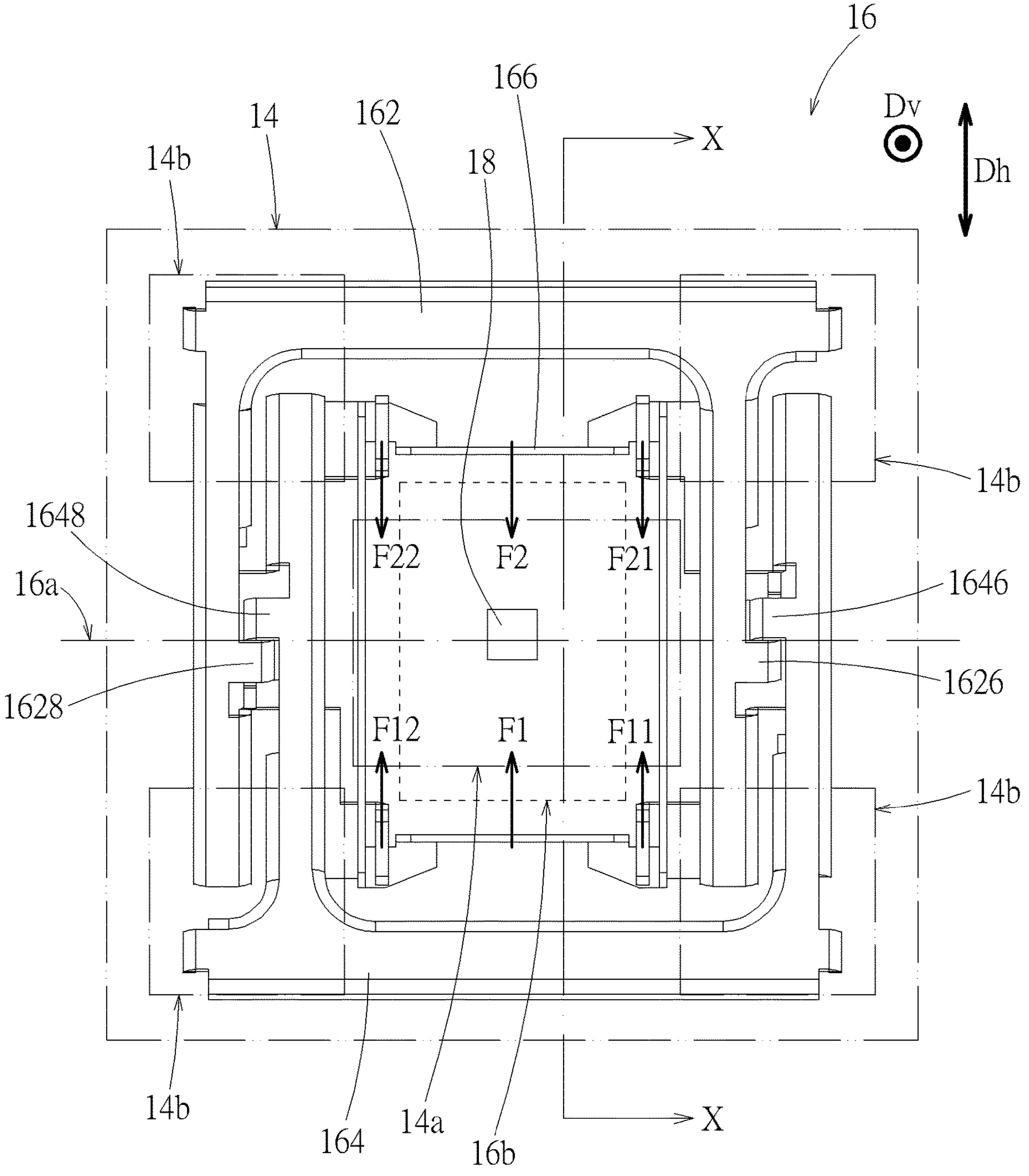
FIG. 5 is a top view of the lift mechanism in FIG. 3; therein, the profile of the keycap and the corresponding locations of light-emitting areas defined on the keycap are shown in chain lines.
Figure 6:
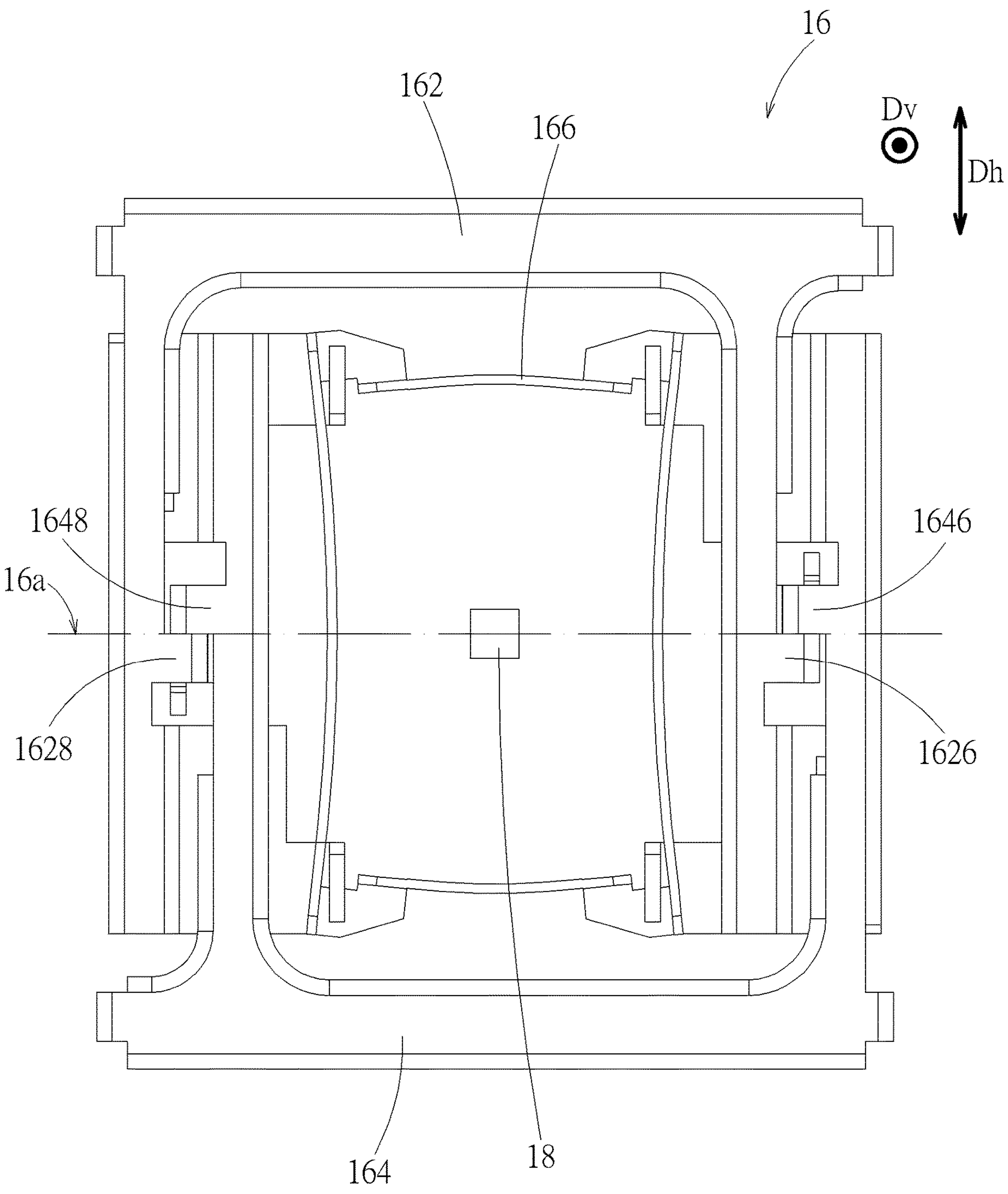
FIG. 6 is a top view of the lift mechanism in FIG. 5 after the keycap is pressed.

Furthermore, as shown by FIG. 5, the spring structure 166 applies forces F11 and F12 (indicated by an arrow in the figure) to the two side arm portions 1620*a* of the first support 162 and forces F21 and F22 (indicated by an arrow in the figure) to the two side arm portions 1640*a* of the second support 164. The equivalent force F1 (indicated by an arrow in the figure) of the force (including the force F11 and the force F21) exerted by the spring structure 166 on the first support 162 passes through the central space 16*b*, which helps to reduce or eliminate the possibility of the rotation of the first support 162 relative to the vertical direction Dv (i.e., the rotating direction is perpendicular to the vertical direction Dv, or the rotation is parallel to the plane of FIG. 5) due to the force exerted by the spring structure 166. Similarly, the equivalent force F2 (indicated by an arrow in the figure; it is the same in magnitude as and opposite in direction to the equivalent force F1) of the force (including the force F12 and the force F22) exerted by the spring structure 166 on the second support 164 passes through the central space 16*b*, which helps to reduce or eliminate the possibility of the rotation of the second support 164 relative to the vertical direction Dv due to the force exerted by the spring structure 166. That the equivalent forces F1 and F2 are parallel to the horizontal direction Dh and pass through the central space 16*b* helps to make the force on the first support 162 and the second support 164 (including the force between the supports against each other) uniform, which is conducive to the structural stability of the lift mechanism 16. In addition, in the first embodiment, the first support 162 as a whole is structurally symmetrical (relative to the direction perpendicular to the rotation axis 16*a*), and the second support 164 is the same. Therefore, in principle, the forces F11, F12, F21 and F22 have the same magnitude. In practice, the magnitudes of the forces F11, F12, F21 and F22 and their force-applying positions will depend on the actual product and design, and are not limited to the first embodiment.

Figure 7:
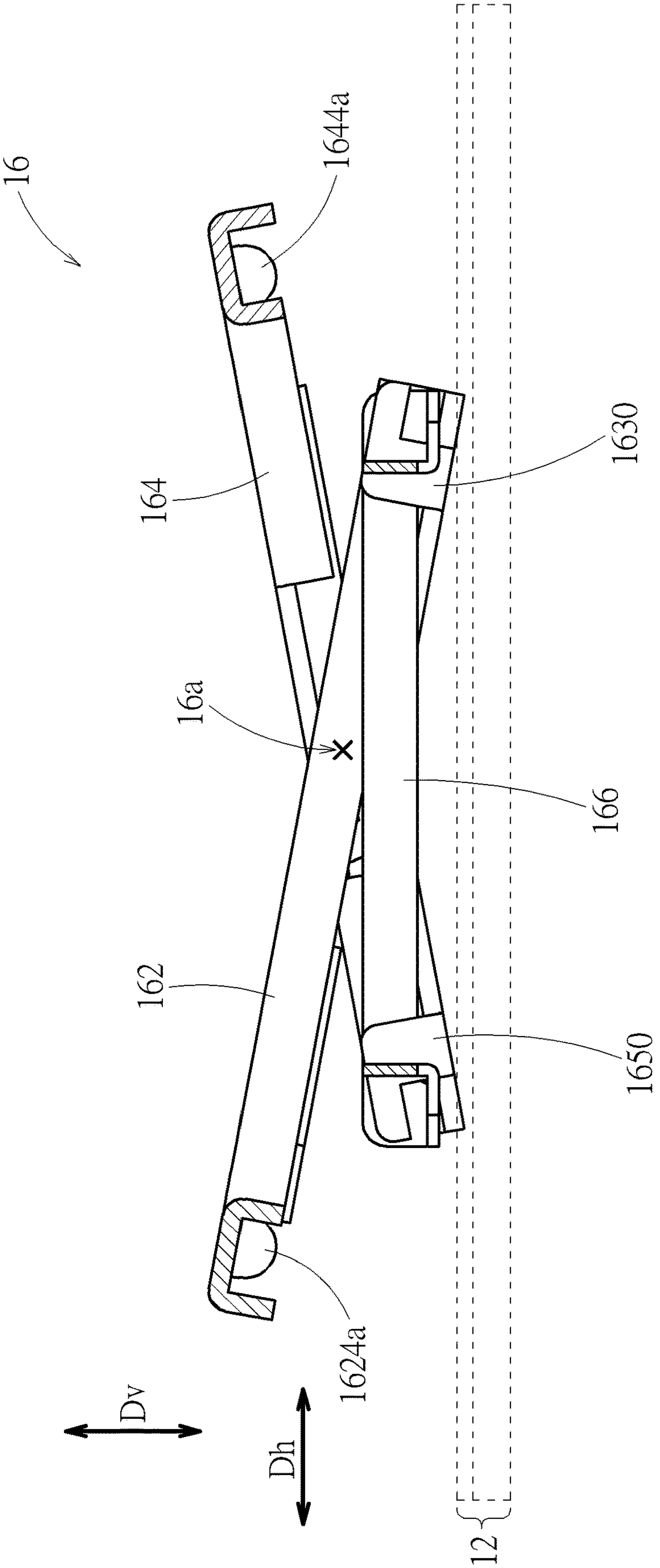
FIG. 7 is a sectional view of the lift mechanism along the line X-X in FIG. 5; therein, the profile of the base is shown in dashed lines.
Figure 8:
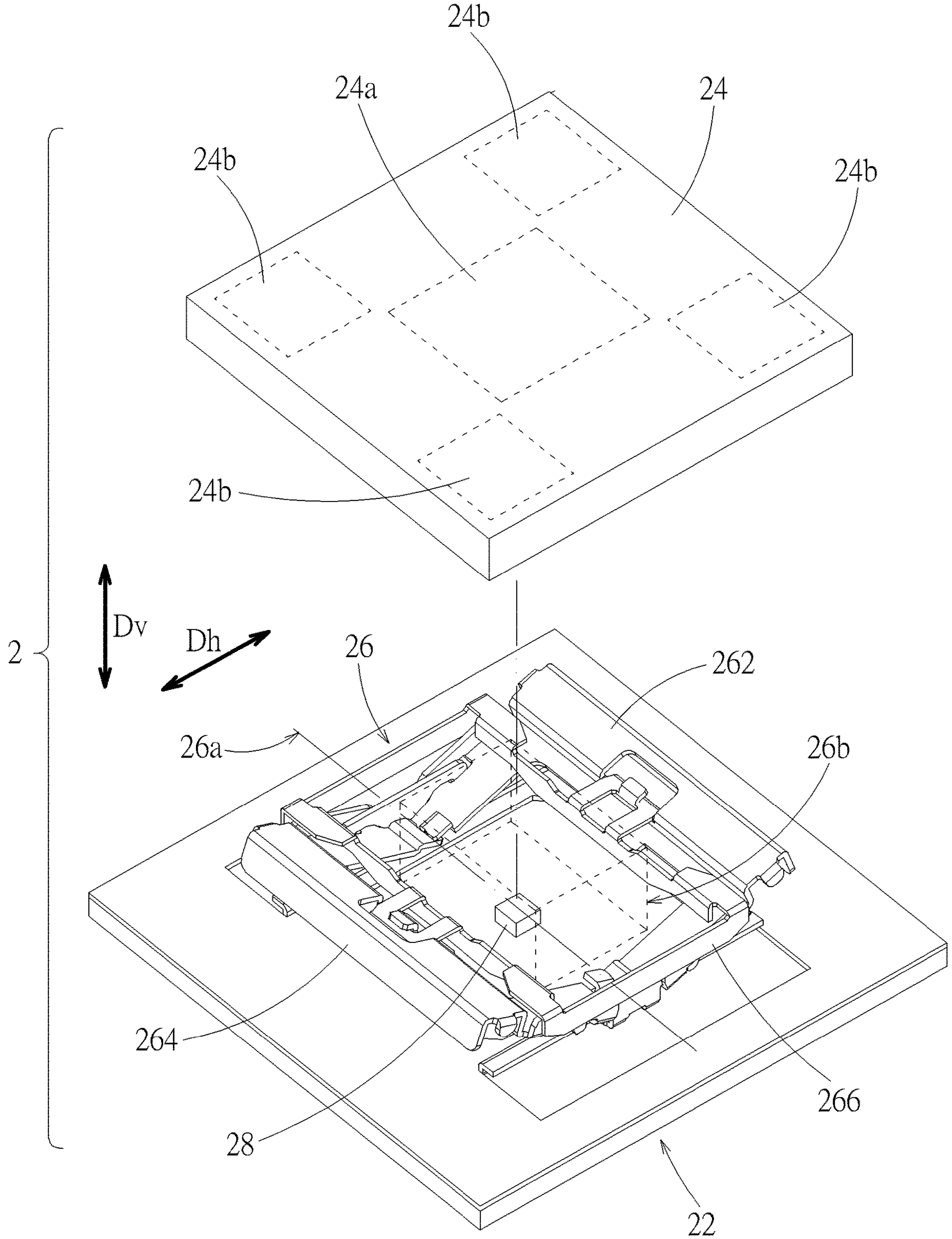
FIG. 8 is a partially exploded view of a keyswitch structure according to a second embodiment.
Figure 9:
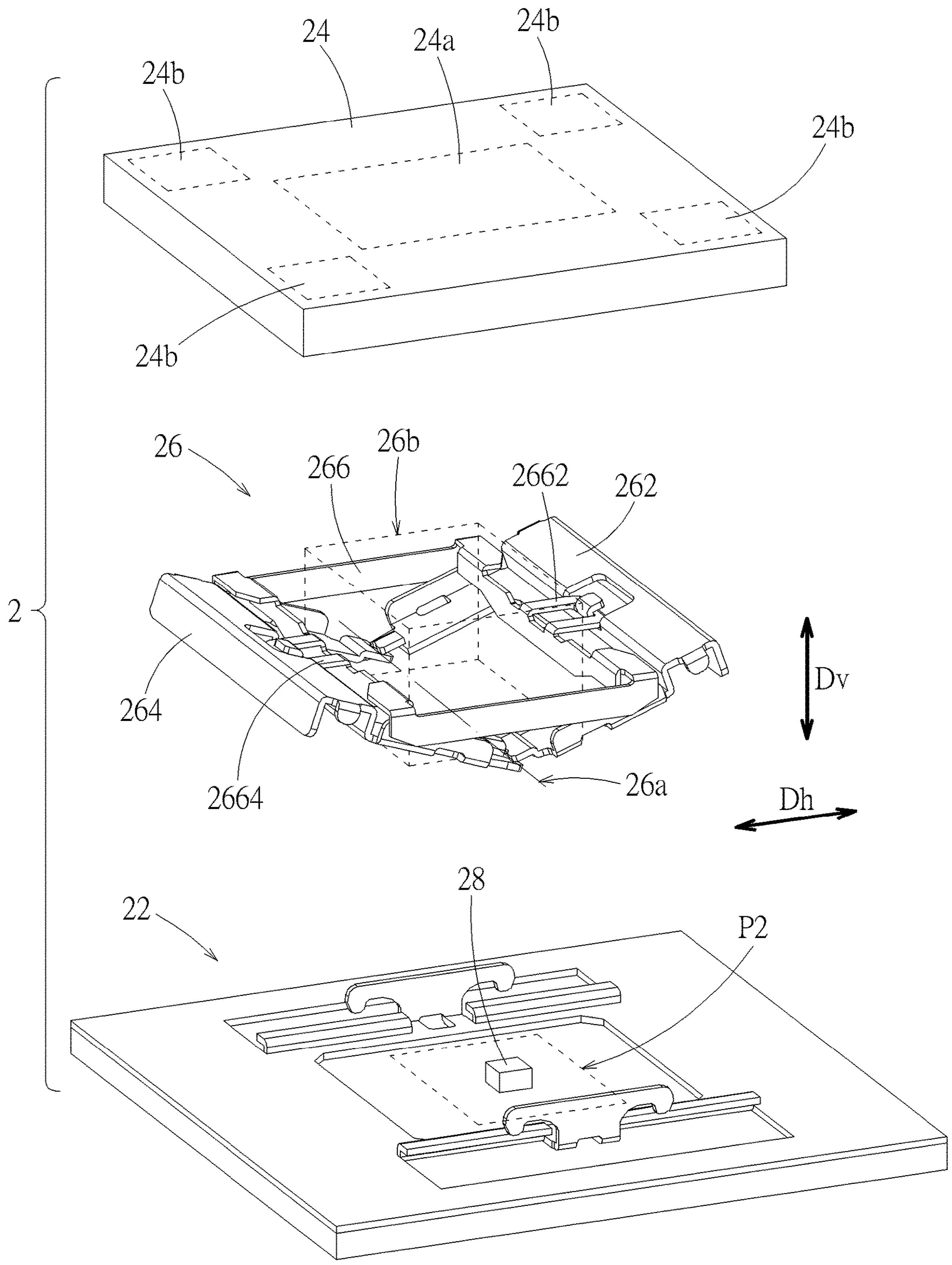
FIG. 9 is another partially exploded view of the keyswitch structure in FIG. 8.

Please refer to FIG. 3 and FIG. 7; therein, the location of the rotation axis 16*a* in FIG. 7 is indicated by a cross mark. In the first embodiment, the spring portion 166 is connected to the first support 162 and the second support 164 near the base 12, so that when the first support 162 and the second support 164 rotate with respect to the rotation axis 16*a* (the keycap 14 is lifted and lowered accordingly), the spring portion 166 is extended and restored roughly at a fixed position in the vertical direction Dv, or the positional change of the spring structure 166 in vertical direction Dv when the spring portion 166 is extended and restored can be significantly reduced (compared to the cases where the spring portion 166 is connected to other portions of the first/second support 162/164).

As shown by FIG. 4, there is a distance 1630*a* between a portion 1630 of the first support 162 connecting with the spring portion 166 and the connecting structure 1622*a* of the first base connecting portion 1622 (in the direction in which the side arm portions 1620*a* of the first support 162 extend). There is a distance 1630*b* between the portion 1630 and the connecting structure 1624*a* of the first keycap connecting portion 1624 (in the direction in which the side arm portions 1620*a* of the first support 162 extend). There is a distance 1650*a* between a portion 1650 of the second support 164 connecting with the spring portion 166 and the connecting structure 1642*a* of the second base connecting portion 1642 (in the direction in which the side arm portions 1640*a* of the second support 164 extend) There is a distance 1650*b* between the portion 1650 and the connecting structure 1644*a* of the second keycap connecting portion 1644 (in the direction in which the side arm portions 1640*a* of the second support 164 extend). The distance 1630*a* is less than the distance 1630*b*, and the distance 1650*a* is less than the distance 1650*b*. In the first embodiment, the distances 1630*a* and 1650*a* are both non-zero values, so in principle, since the spring portion 166 is extended and restored due to the rotation of the first support 162 and the second support 164 with respect to the rotation axis 16*a*, the position of the spring portion 166 in the vertical direction Dv will change within a range of variation. Furthermore, in the first embodiment, the distance 1630*a* and the distance 1650*a* are relatively small, so that the vertical position of the spring portion 166 can be regarded as being constant during its extension and restoration. This structural configuration helps to reduce the space required for the spring portion 166 to act, and reduce the possibility of the spring portion 166 interfering with other structures, and is also conducive to the stability of the spring portion 166 during its extension and restoration.

As shown by FIG. 3 and FIG. 5, the spring structure 166 does not enter the central space 16*b*, but the equivalent forces (including the equivalent force F1 and the equivalent force F2) of the restoring force provided by the spring structure 166 to the first support 162 and the second support 164 can pass through the central space 16*b*, which is conducive to the stability of the movement of the first support 162 and the second support 164. In the lift mechanism 16, the first support 162, the second support 164, and the spring structure 166 will never enter the central space 16*b* during the action of the lift mechanism 16, so the central space 16*b* is the open space provided by the lift mechanism 16 in the vertical direction Dv. The central space 16*b* can be used by other components of the keyswitch structure 1 (for example, for accommodating a switch or preventing the upward traveling light from being structurally disturbed by the lift mechanism 16), and is also conducive to designs of low-profile keyswitch. In a keyswitch structure that generally uses an elastic dome to provide the restoring force to the supports thereof, the elastic dome is disposed at the central position, so that if the backlight travels upward from the bottom of the elastic dome, it will be disturbed by the elastic dome, which will affect the backlight effect to the keycap. On the contrary, in the first embodiment, the central space 16*b* of the lift mechanism 16 allow light-emitting parts to be disposed corresponding to the central space 16*b*, which can easily provide the symmetrical backlight effect to the keycap 14.

Please refer to FIG. 1 to FIG. 3, and FIG. 5. The keycap 14 thereon defines a plurality of light-emitting areas (shown in dashed lines in FIG. 1 to FIG. 3), including a main light-emitting area 14*a* and four corner light-emitting areas 14*b* which are arranged at the central area and corner areas of the keycap 14, respectively. In FIG. 5, the profile of the keycap 14 and the locations corresponding to the light-emitting areas 14*a* and 14*b* are shown in chain lines. As shown by FIG. 5 (from the view point of FIG. 5), the main light-emitting area 14*a* mostly overlaps with the central space 16*b* of the lift mechanism 16, and the main light-emitting area 14*a* is located inside the spring portion 166. The corner light-emitting areas 14*b* do not overlap with the central space 16*b*, and the corner light-emitting areas 14*b* partially overlap with the first support 162 and the second support 164. In actual products, the keycap 14 is not necessarily provided with light-transmitting structures (such as but not limited to light-transmitting characters) on the light-emitting areas 14*a* and 14*b*. When the light source providing the backlight is disposed on the base 12 corresponding to the central space 16*b*, during the operation of the keyswitch structure 1, no matter whether the keycap 14 is pressed down or not, the light emitted by the light source can directly illuminate the main light-emitting area 14*a*. When the keycap 14 is not pressed, the light emitted by the light source can also illuminate the corner light-emitting areas 14*b*, which provides an indication effect to the user at least when the keycap 14 is not pressed.

Please refer to FIG. 2, FIG. 3 and FIG. 7. In the first embodiment, the base 12 includes a circuit board 122 and a bottom plate 124 stacked on the circuit board 122. The lift mechanism 16 is connected to the base 12 by connecting with the bottom plate 124. In practice, the bottom plate 124 may be formed by, but not limited to, stamping a metal plate. The circuit board 122 may be, but not limited to, a printed circuit board. The keyswitch structure 1 also includes a light-emitting part 18 (e.g., but not limited to light-emitting diodes). The light-emitting part 18 is disposed on the base 12 (e.g., directly electrically fixed on the circuit board 122) and within the projection P1 (indicated by a dashed frame in FIG. 3) of the central space 16*b* on the base 12 (or the circuit board 122 thereof). The light-emitting part 18 emits light upward to illuminate the keycap 14, e.g., to provide backlight to the keycap 14. In addition, in practice, the switch (not shown in the figures) of the keyswitch structure 1 may be realized by a membrane circuit board (e.g., a structure of three layers, stacked on the base plate 124; therein, the upper and lower layers carry switch circuitry, and the middle layer acts as circuit insulation), or a tactile switch (e.g., directly electrically fixed on the circuit board 122). A corresponding structure for triggering the switch may be disposed on the keycap 14 or the supports 162 and 164, and can trigger the switch when the keycap 14 is pressed.

Figure 10:
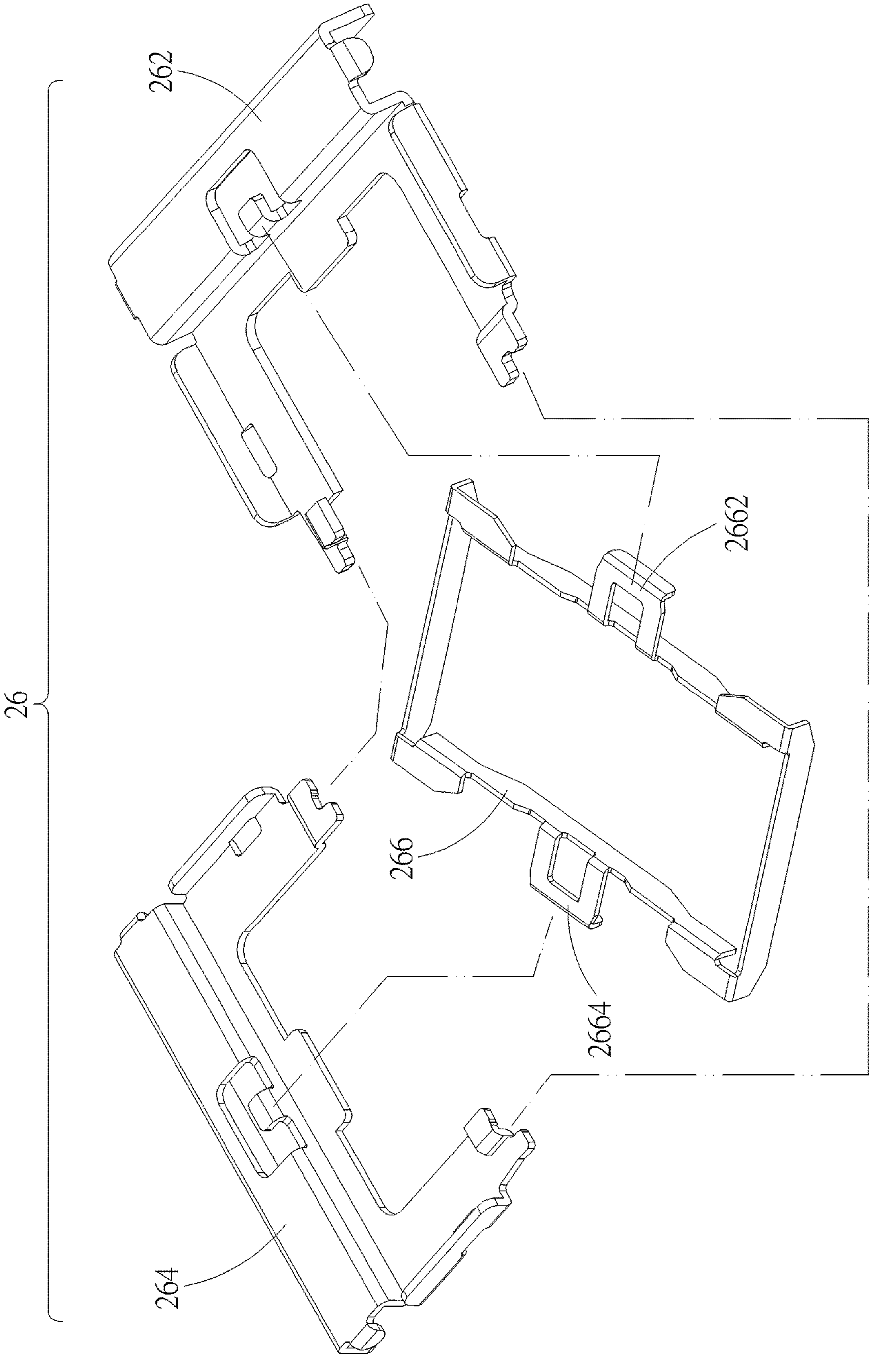
FIG. 10 is an exploded view of a lift mechanism in FIG. 9.
Figure 11:
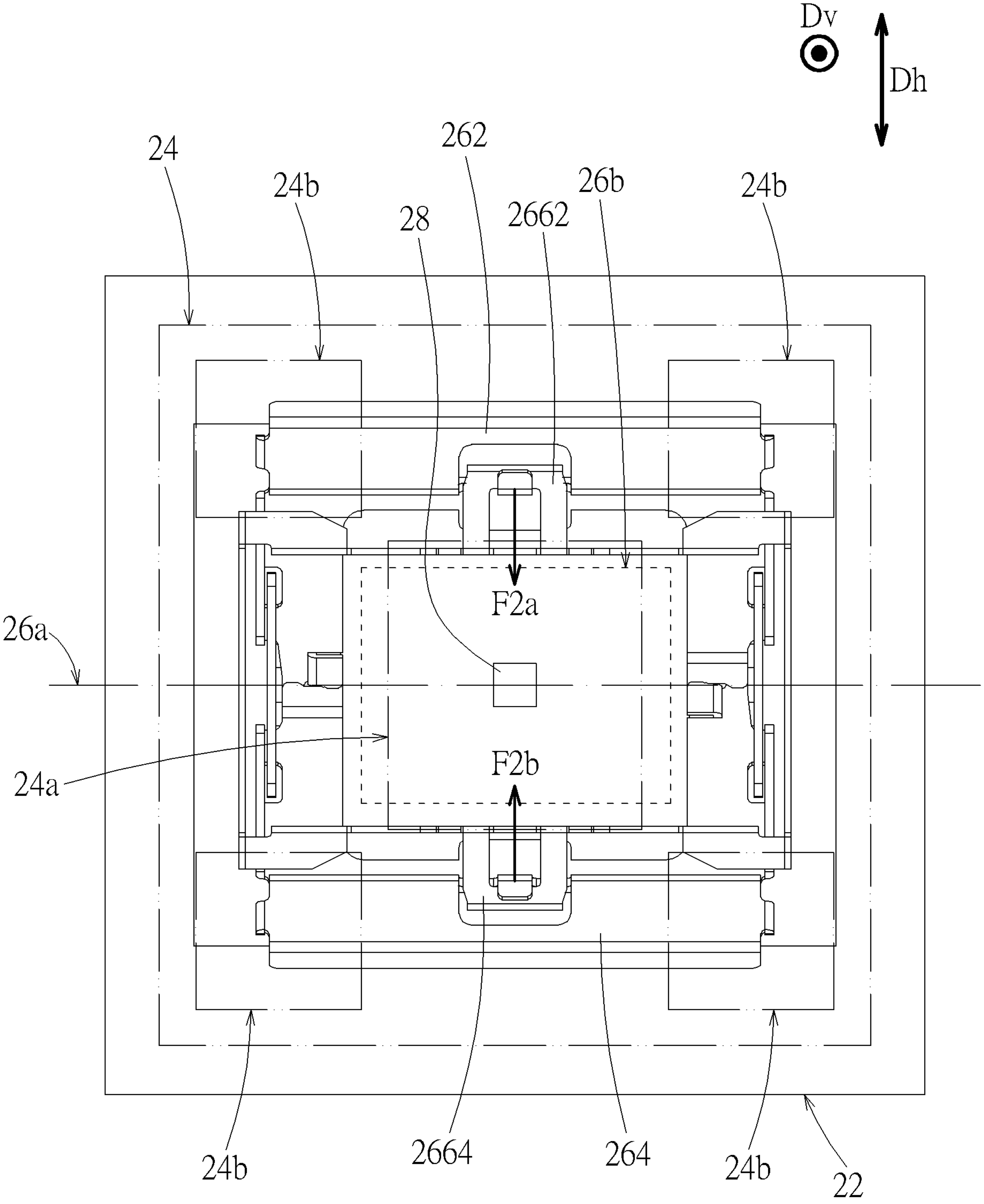
FIG. 11 is a top view of the lift mechanism in FIG. 8; therein, the keycap is not shown in this figure, but the profile of the keycap and the corresponding locations of light-emitting areas defined on the keycap are shown in chain lines.

In the first embodiment, the spring structure 166 is connected to the lower portions of the first support 162 and the second support 164 (relative to the rotation axis 16*a*), and the first support 162 and the second support 164 as a whole is an X-shaped supporting structure, as shown by FIG. 10 and FIG. 11; however, it is not limited thereto in practice. For example, please refer to FIG. 8 to FIG. 11. A keyswitch structure 2 according to a second embodiment and the keyswitch structure 1 according to the first embodiment are similar in structure, so for other descriptions about components of the keyswitch structure 2, please refer to the relevant descriptions of the same named components of the keyswitch structure 1 and the variants thereof, which will not be described in addition. The keyswitch structure 2 includes a base 22, a keycap 24, a lift mechanism 26, and a light-emitting part 28. The keycap 24 is disposed above the base 22 in the vertical direction Dv. The lift mechanism 26 is connected to and between the base 22 and the keycap 24, so that the keycap 24 can move relative to the base 22 in the vertical direction Dv through the lift mechanism 26. Therein, the lift mechanism 26 includes a first support 262, a second support 264, and a spring structure 266. The first support 262 and the second support 264 are connected to and between the base 22 and the keycap 24 and can rotate relative to each other, so as to support the keycap 24 (therein, the first support 262 and the second support 264 rotate roughly with respect to a rotation axis 26*a* (indicated by a chain line in the figures); on the other hand, the rotation axes of the first support 262 and the second support 264 are substantially parallel to the rotation axis 26*a*), so that the keycap 24 can move relative to the base 22 in the vertical direction Dv through the first support 262 and the second support 264. The spring structure 266 is connected to the first support 262 and the second support 264 to provide a restoring force to the first support 262 and the second support 264. The restoring force can drive the first support 262 and the second support 264 to lift the keycap 24 in the vertical direction Dv. The light-emitting part 28 is disposed on the base 22. The light-emitting part 28 emits light upward to illuminate the keycap 24.

Furthermore, in the second embodiment, the first bracket 262 and the second bracket 264 are respectively a n-shaped structure. The first support 262 and the second support 264 can be mutually driven and constrained in structure through the ends (of the n-shaped structures). The side view of the first support 262 and the second support 264 roughly show a V-shaped configuration (or butterfly configuration). The spring structure 266 is also a bent plate and has a rectangular structure as a whole. The spring structure 266 further includes two connecting portions 2662 and 2664, which are located on the middle portions of the two opposite sides of the rectangular structure, respectively, and are connected to the portions of the first support 262 and the second support 264 near the keycap 14 (i.e., the upper portions thereof relative to the rotation axis 26*a*), respectively. The lift mechanism 26 as a whole defines a central space 26*b* (indicated by a dashed box in the figures), which extends through the whole lift mechanism 26 in the vertical direction Dv. The first support 262 and the second support 264 jointly surround the central space 26*b*. The spring structure 266 does not enter the central space 26*b* and surrounds the central space 26*b*, which makes the first support 262, the second support 264, and the spring structure 266 never enter the central space 26*b* during the action of the lift mechanism 26, so the central space 26*b* is the open space provided by the lift mechanism 26 in the vertical direction Dv. The central space 26*b* can be used by other components of the keyswitch structure 2 (for example, for accommodating a switch or preventing the upward traveling light from the light-emitting part 28 from being structurally disturbed by the lift mechanism 26), and is also conducive to designs of low-profile keyswitch. The spring structure 266 are connected to the first support 262 and the second support 264 in tension, so that the spring structure 266 will drive the first support 262 and the second support 264 to approach each other in the horizontal direction Dh (perpendicular to the vertical direction Dv and the rotation axis 26*a*), thereby lifting the keycap 24. Therein, when the keycap 24 is pressed, the first support 262 and the second support 264 stretch the spring structure 266 in the horizontal direction Dh (so that the plate structure of the spring structure 266 is bent and the structural frame of the spring structure 266 is elastically deformed). The spring structure 266 applies forces F2*a* and F2*b* to the first support 262 and the second support 264, respectively (as shown in FIG. 11). The forces F2*a* and F2*b* have the same magnitude and opposite directions. In the second embodiment, the spring structure 266 only applies force to the first support 262 and the second support 264 in a single place, so the forces F2*a* and F2*b* are also directly regarded as equivalent forces in logic, which are parallel to the horizontal direction Dh and pass through the central space 26*b*. This configuration helps to make the force on the first support 262 and the second support 264 (including the force between the supports against each other) uniform and is conducive to the structural stability of the lift mechanism 26.

Furthermore, the light-emitting part 28 is located within the projection P2 (indicated by a dashed frame in FIG. 9) of the central space 26*b* on the base 22. The keycap 24 thereon defines a plurality of light-emitting areas (shown in dashed lines in FIG. 8 and FIG. 9), including a main light-emitting area 24*a* and four corner light-emitting areas 24*b* which are arranged at the central area and corner areas of the keycap 24, respectively. In FIG. 11, the profile of the keycap 24 and the locations corresponding to the light-emitting areas 24*a* and 24*b* are shown in chain lines. As shown by FIG. 11 (from the view point of FIG. 11), the main light-emitting area 24*a* mostly overlaps with the central space 26*b* of the lift mechanism 26, and the main light-emitting area 24*a* is located inside the spring portion 266. The corner light-emitting areas 24*b* do not overlap with the central space 26*b*, and the corner light-emitting areas 24*b* partially overlap with the first support 262 and the second support 264. During the operation of the keyswitch structure 2, no matter whether the keycap 24 is pressed down or not, the light emitted by the light-emitting part 28 can directly illuminate the main light-emitting area 24*a*. When the keycap 24 is not pressed, the light emitted by the light-emitting part 28 can also illuminate the corner light-emitting areas 24*b*, which provides an indication effect to the user at least when the keycap 24 is not pressed.

In addition, in practice, the switch (not shown in the figures) of the keyswitch structure 2 may be realized by a membrane circuit board (e.g., a structure of three layers, stacked on the base 22; therein, the upper and lower layers carry switch circuitry, and the middle layer acts as circuit insulation), or a tactile switch. A corresponding structure for triggering the switch may be disposed on the keycap 24 or the supports 262 and 264, and can trigger the switch when the keycap 24 is pressed.

Figure 12:
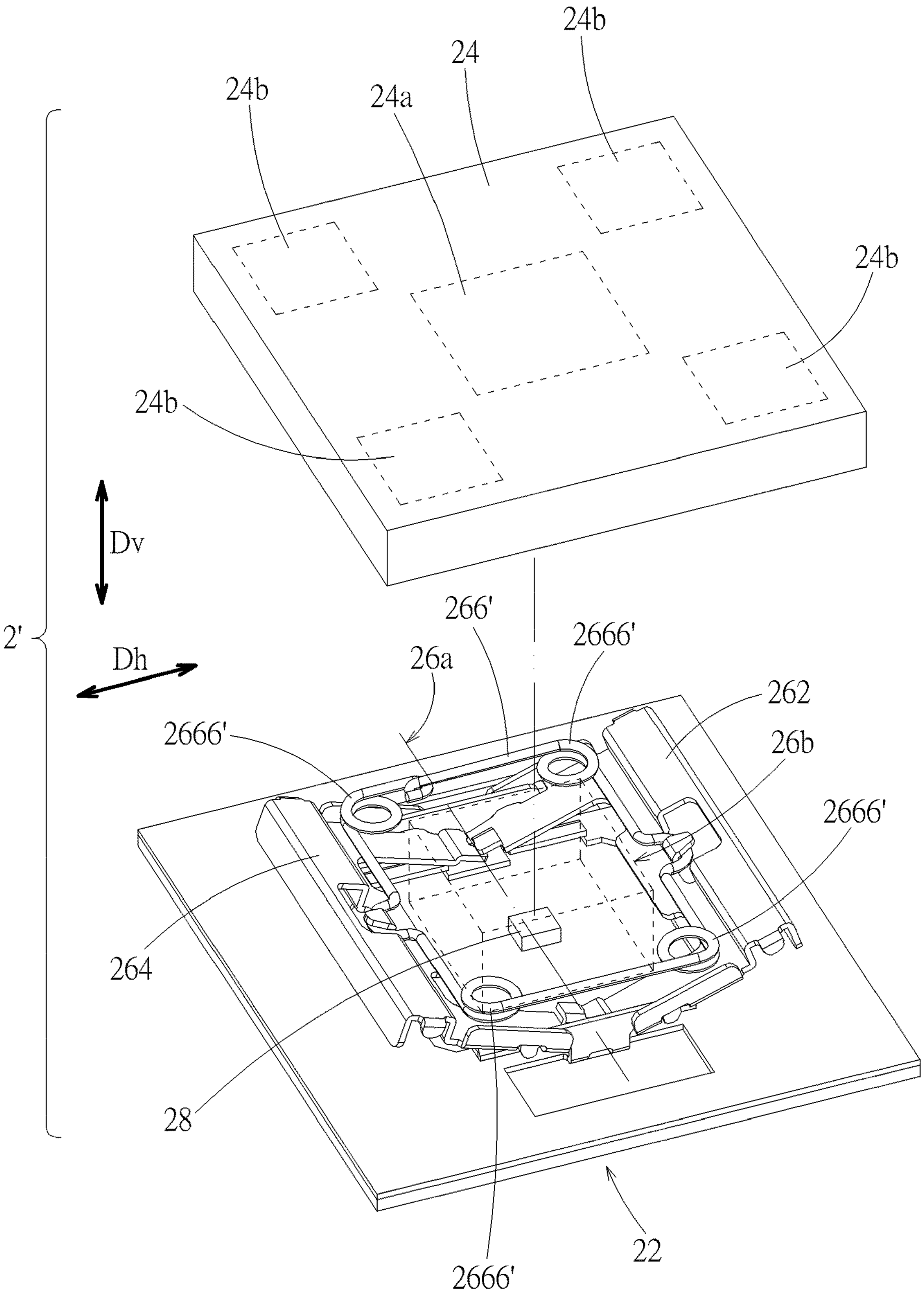
FIG. 12 is a partially exploded view of a keyswitch structure according to a third embodiment.
Figure 13:
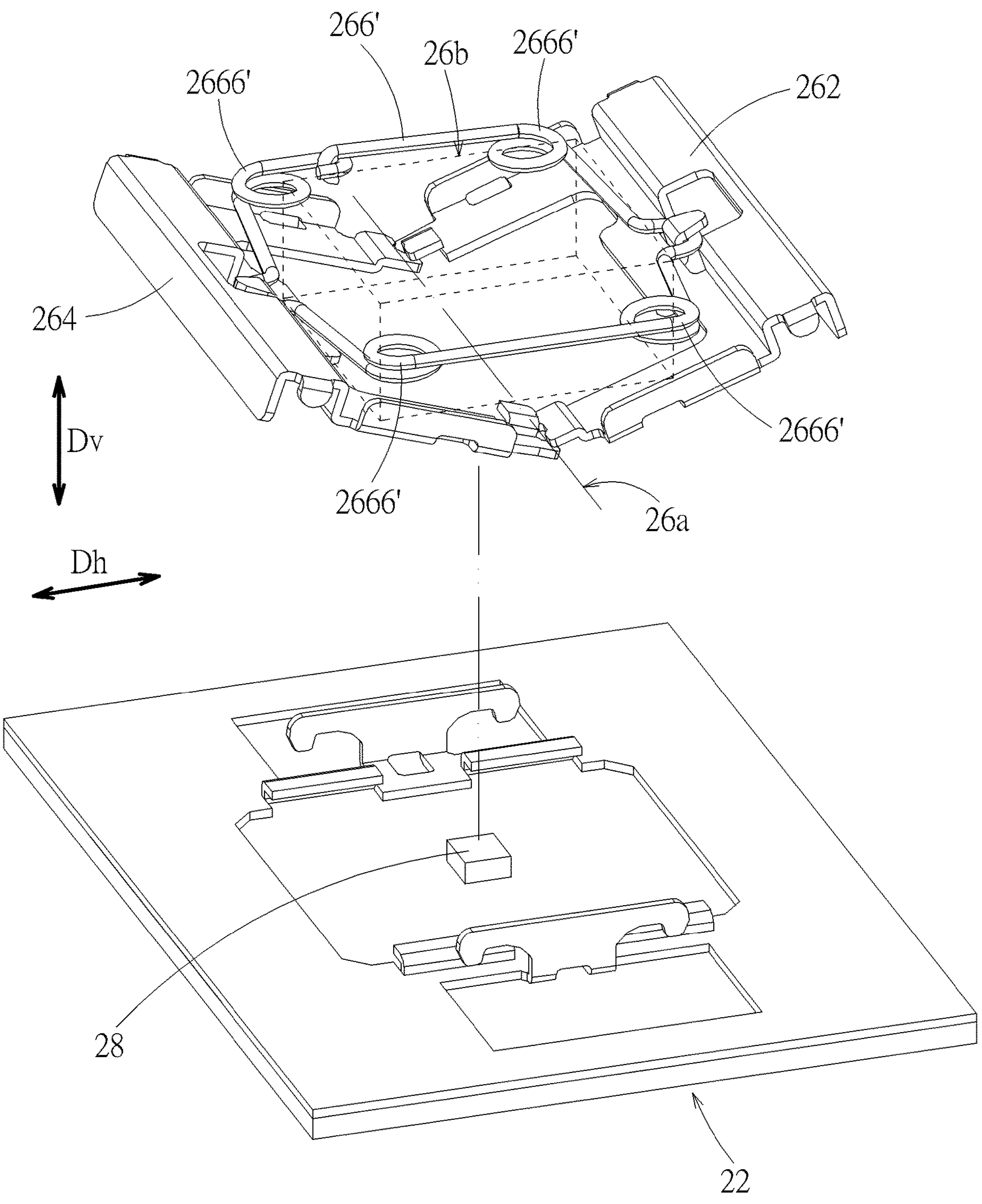
FIG. 13 is another partially exploded view of the keyswitch structure in FIG. 12; therein, the keycap is not shown in this figure.
Figure 14:
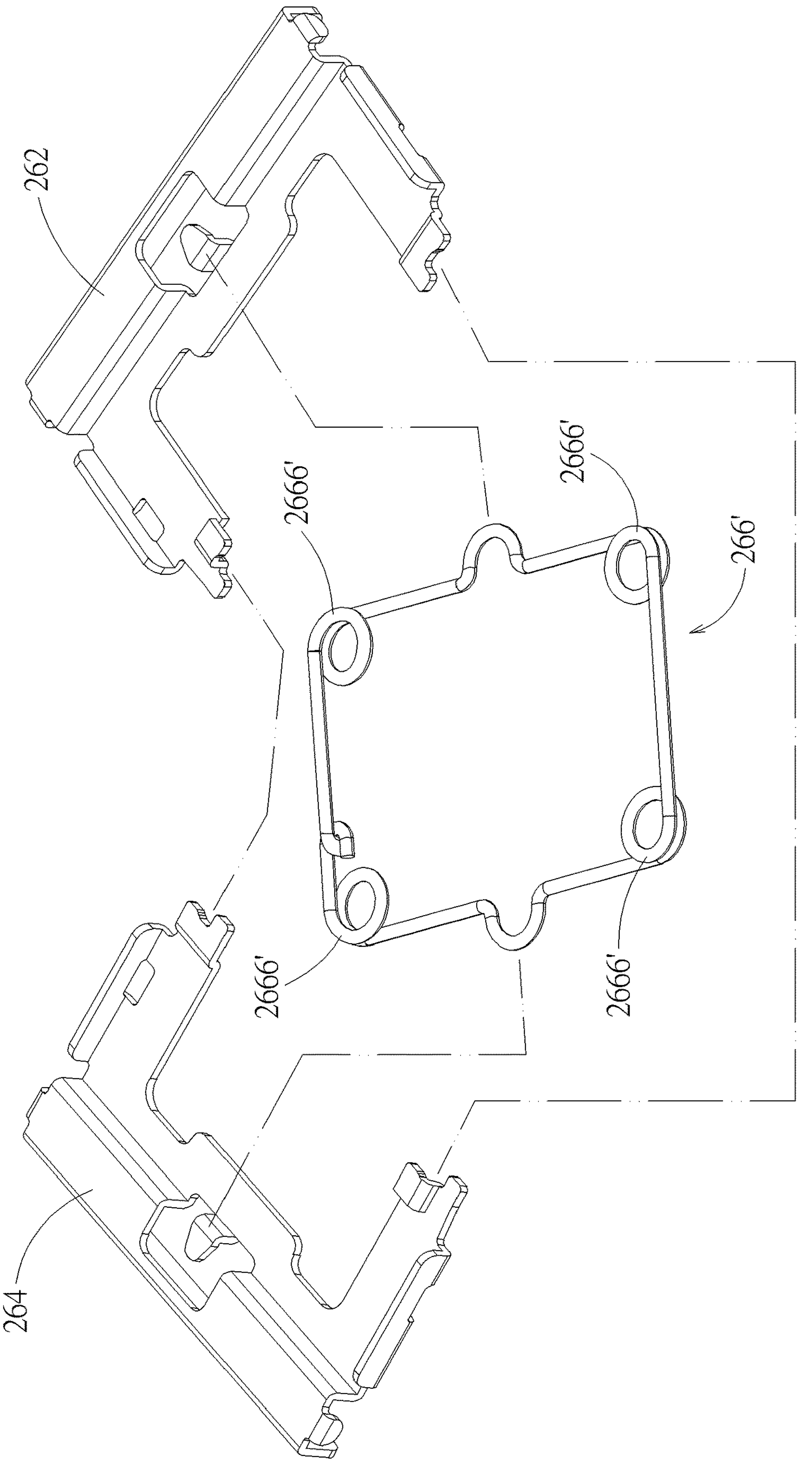
FIG. 14 is an exploded view of a lift mechanism in FIG. 13.

In the keyswitch structures 1 and 2, the spring structures 166 and 266 are made of plates; however, it is not limited thereto in practice. For example, as shown by FIG. 12 to FIG. 14, a keyswitch structure 2' according to a third embodiment is similar in structure to the keyswitch structure 2 according to the second embodiment, and uses the reference numbers of the keyswitch structure 2. For other descriptions about components of the keyswitch structure 2', please refer to the relevant descriptions of the keyswitch structure 2, which will not be described in addition. A main difference between the keyswitch structure 2' and the keyswitch structure 2 is that the spring structure 266' of the keyswitch structure 2' is a bent wire (e.g., a metal wire). Similarly, the spring structure 266' is connected to the first support 262 and the second support 264 in tension, so that the spring structure 266' can produce a restoring force to drive the first support 262 and the second support 264 to approach each other in the horizontal direction Dh (perpendicular to the vertical direction Dv and the rotation axis 26*a*), thereby lifting the keycap 24. Therein, when the keycap 24 is pressed, the first support 262 and the second support 264 stretch the spring structure 266' in the horizontal direction Dh. Furthermore, the spring structure 266' has a helical spring portion 2666' at each of the four corners, which can provide a torsion spring effect and can reduce the overall spring constant of the spring structure 266'.

Figure 15:
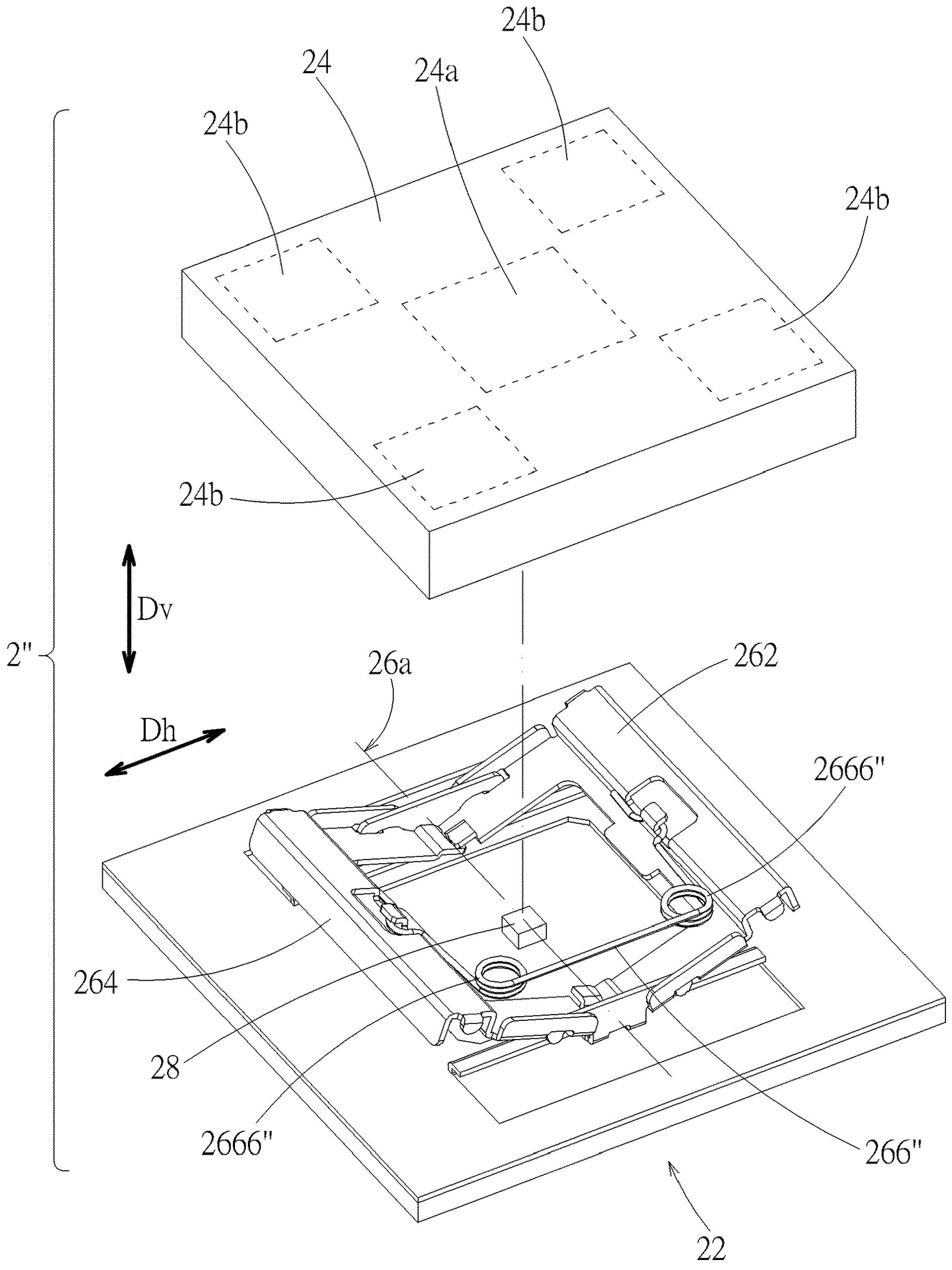
FIG. 15 is a partially exploded view of a keyswitch structure according to a fourth embodiment.
Figure 16:
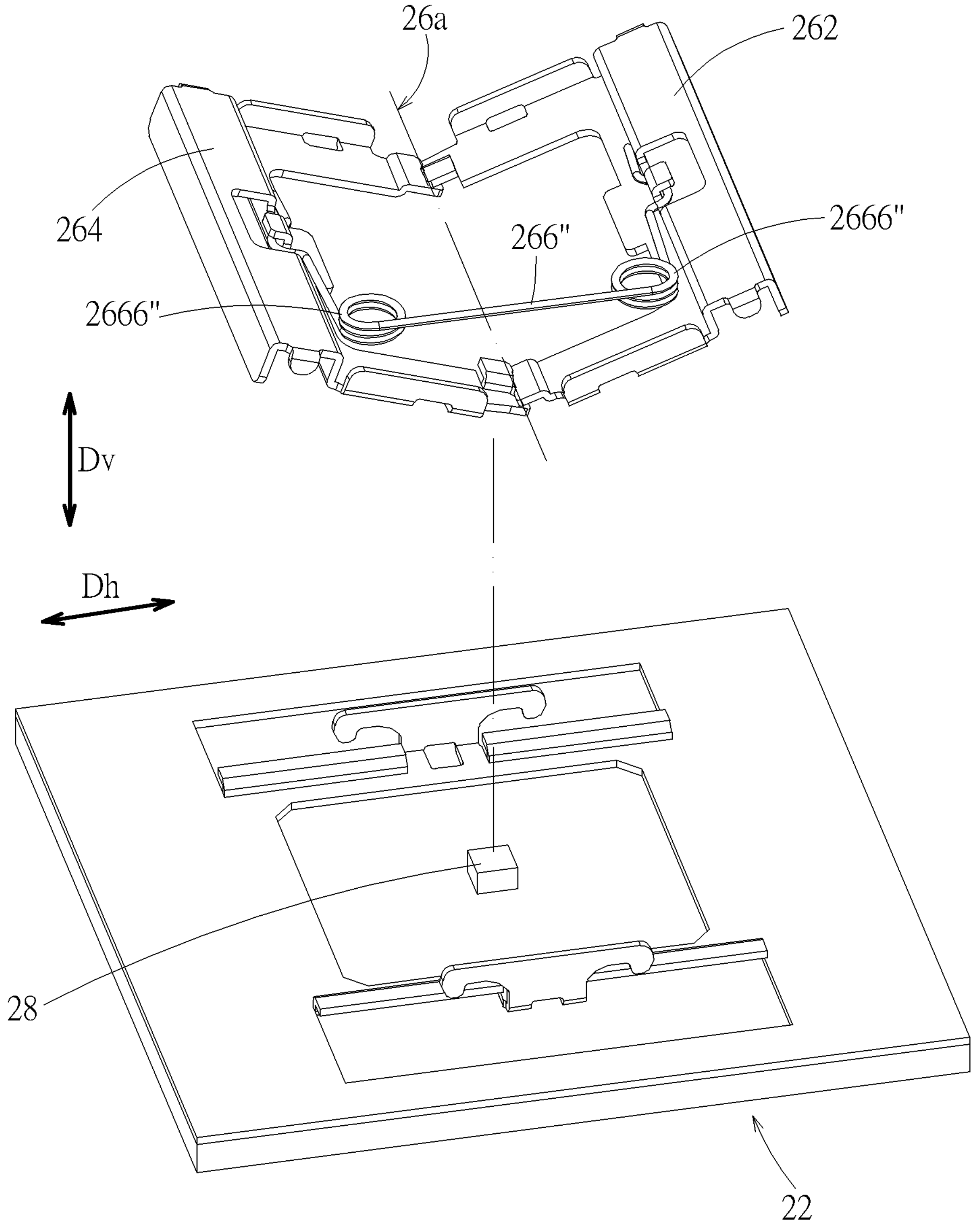
FIG. 16 is another partially exploded view of the keyswitch structure in FIG. 15; therein, the keycap is not shown in this figure.
Figure 17:
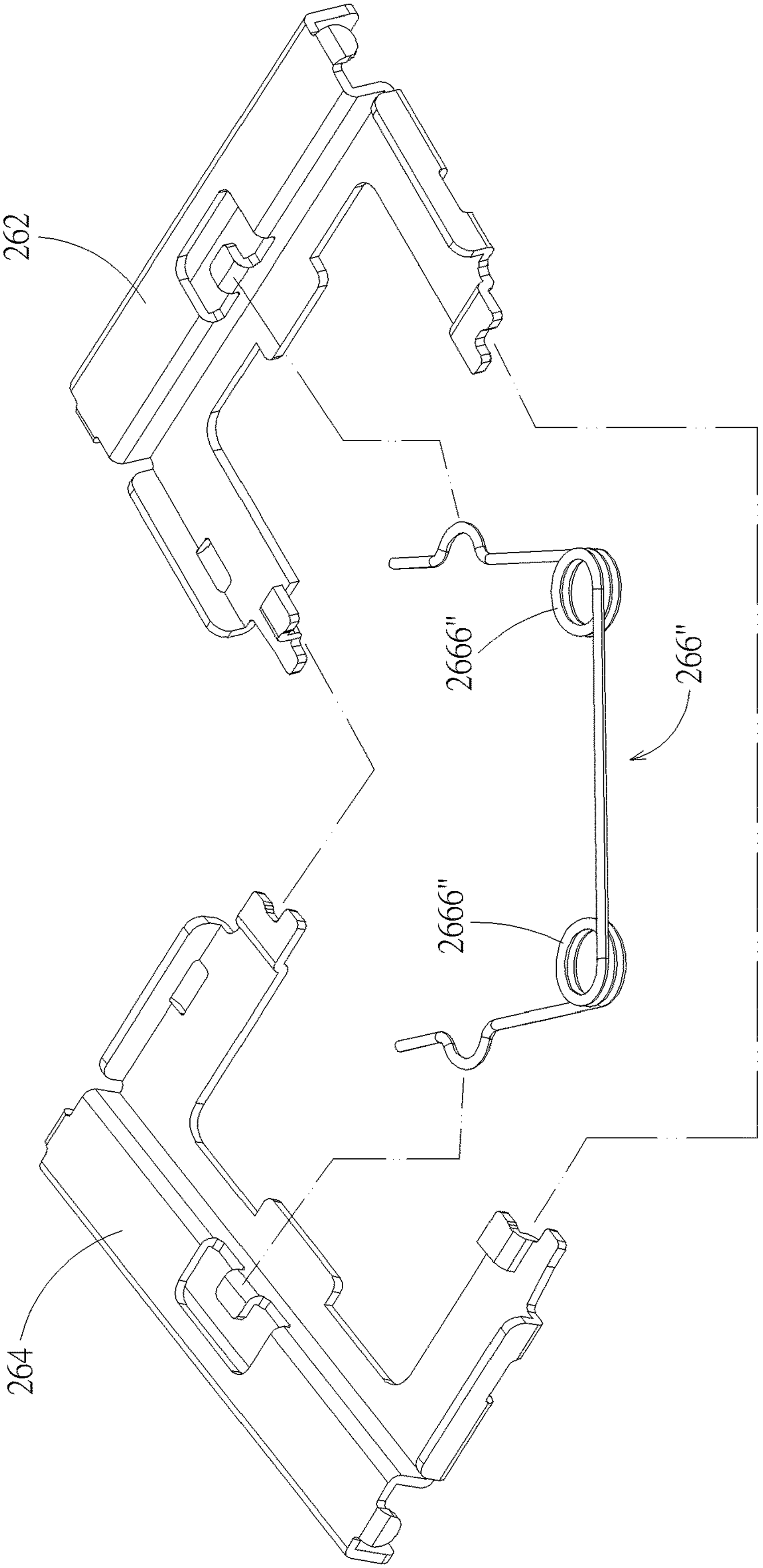
FIG. 17 is an exploded view of a lift mechanism in FIG. 16.
Figure 18:
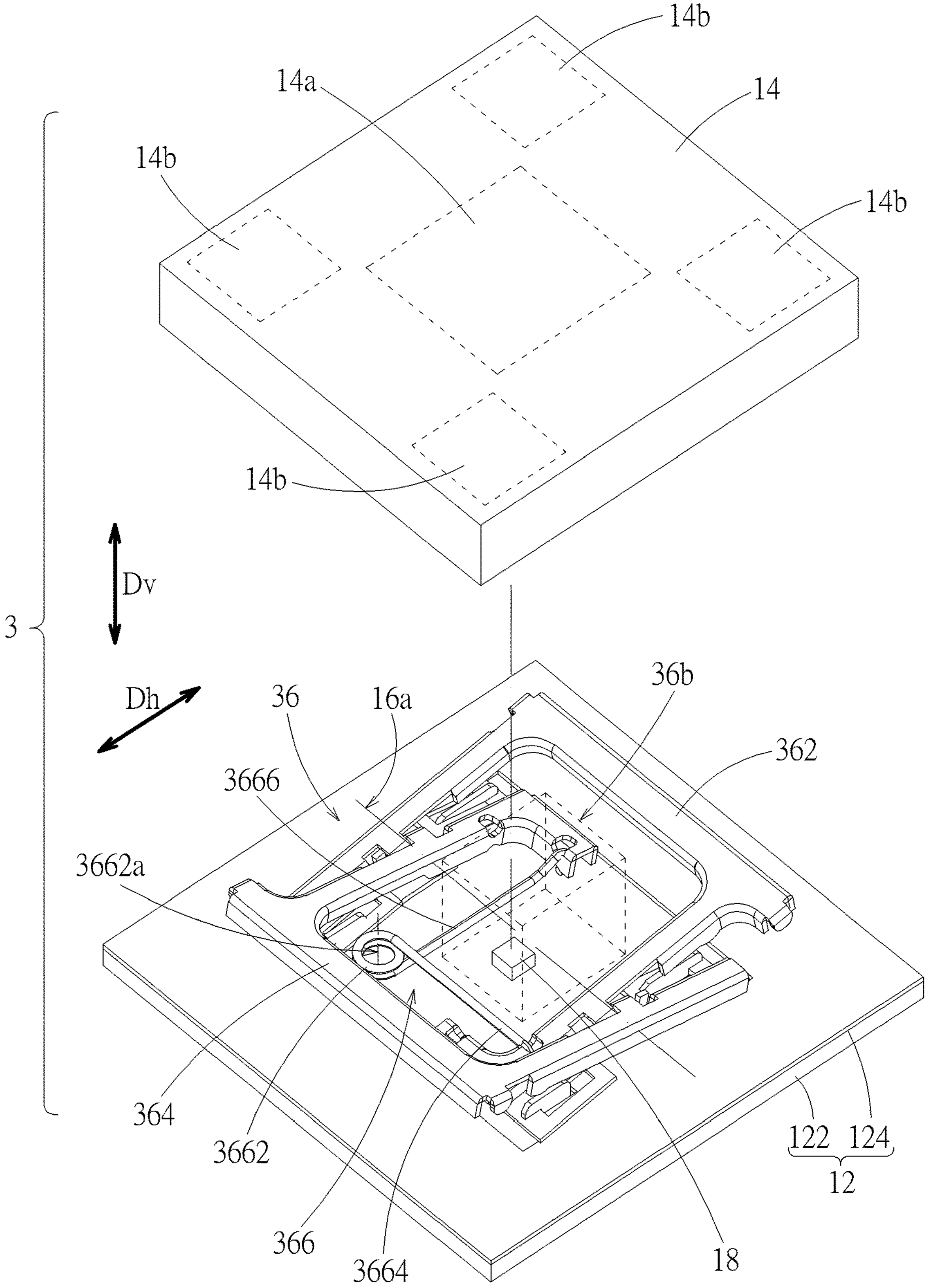
FIG. 18 is a partially exploded view of a keyswitch structure according to a fifth embodiment.
Figure 19:
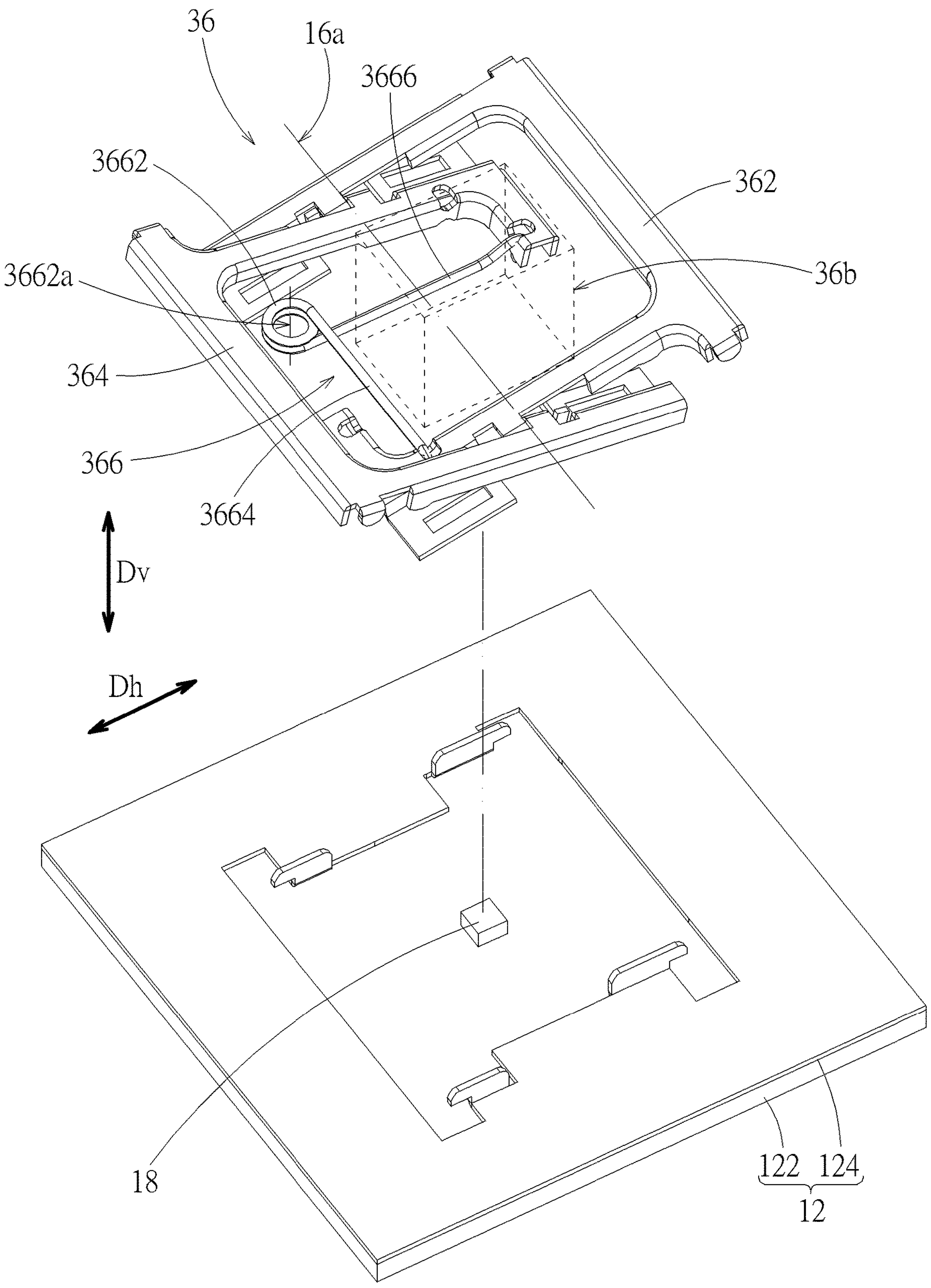
FIG. 19 is another partially exploded view of the keyswitch structure in FIG. 18; therein, the keycap is not shown in this figure.
Figure 20:
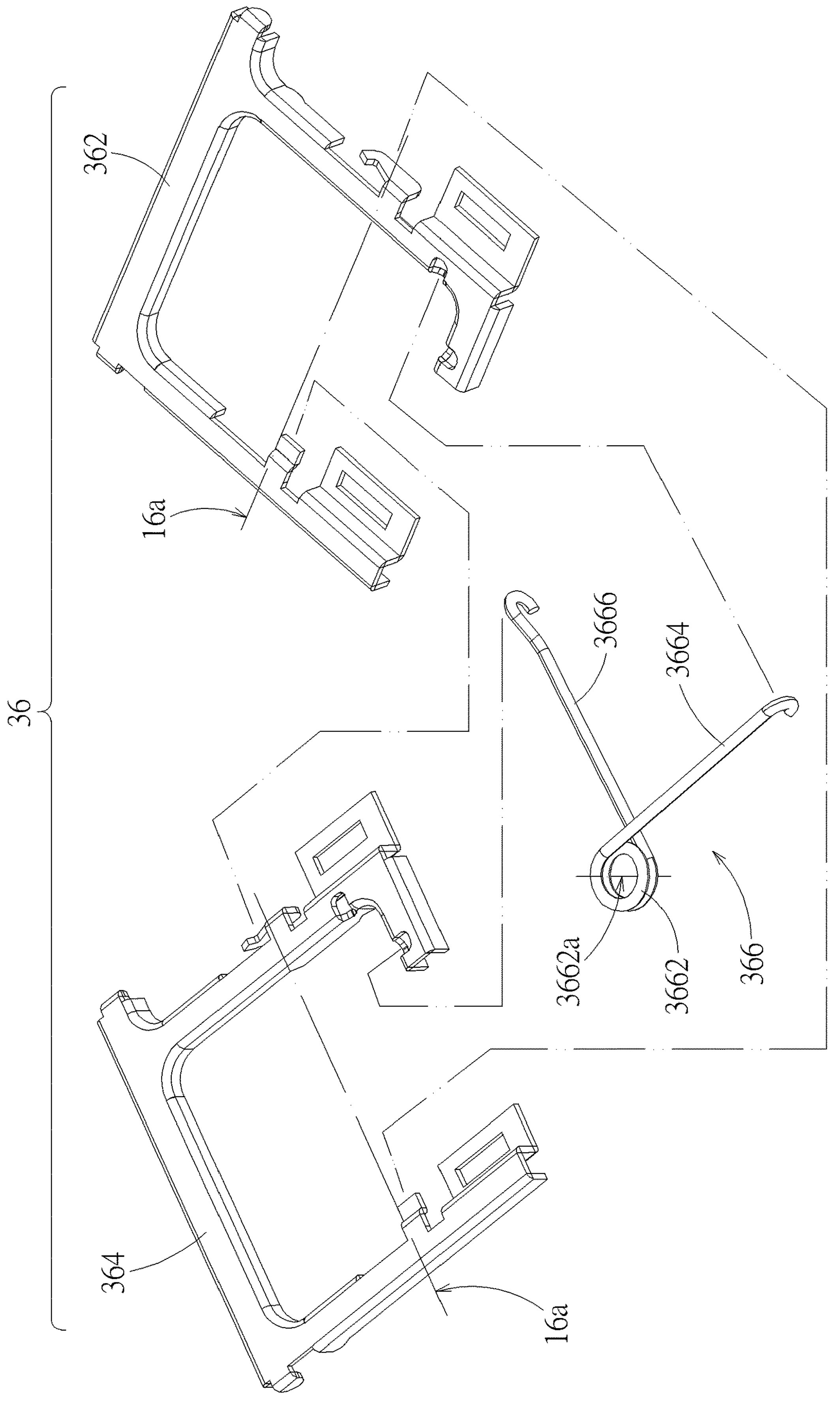
FIG. 20 is an exploded view of a lift mechanism in FIG. 19.

In the above embodiments, the spring structures 166, 266 and 266' are ring-shaped structures, which are implemented in quadrilateral structures; however, it is not limited thereto in practice. For example, the ring-shaped structure is implemented in a circular or other polygonal structure. For another example, as shown by FIG. 15 to FIG. 17, a keyswitch structure 2" according to a fourth embodiment is similar in structure to the keyswitch structure 2 according to the second embodiment, and uses the reference numbers of the keyswitch structure 2. For other descriptions about components of the keyswitch structure 2", please refer to the relevant descriptions of the keyswitch structure 2, which will not be described in addition. A main difference between the keyswitch structure 2" and the keyswitch structure 2 is that the spring structure 266" of the keyswitch structure 2" is a bent wire (e.g., a metal wire). The spring structure 266" as a whole is a C-shaped structure, extending around the central space 26*b*. Similarly, the spring structure 266" is connected to the first support 262 and the second support 264 in tension, so that the spring structure 266" can produce a restoring force to drive the first support 262 and the second support 264 to approach each other in the horizontal direction Dh (perpendicular to the vertical direction Dv and the rotation axis 26*a*), thereby lifting the keycap 24. Therein, when the keycap 24 is pressed, the first support 262 and the second support 264 stretch the spring structure 266" in the horizontal direction Dh. Furthermore, in the fourth embodiment, the spring structure 266" has two corners and has a helical spring portion 2666" at each corner, which can provide a torsion spring effect and can reduce the overall spring constant of the spring structure 266".

Figure 21:
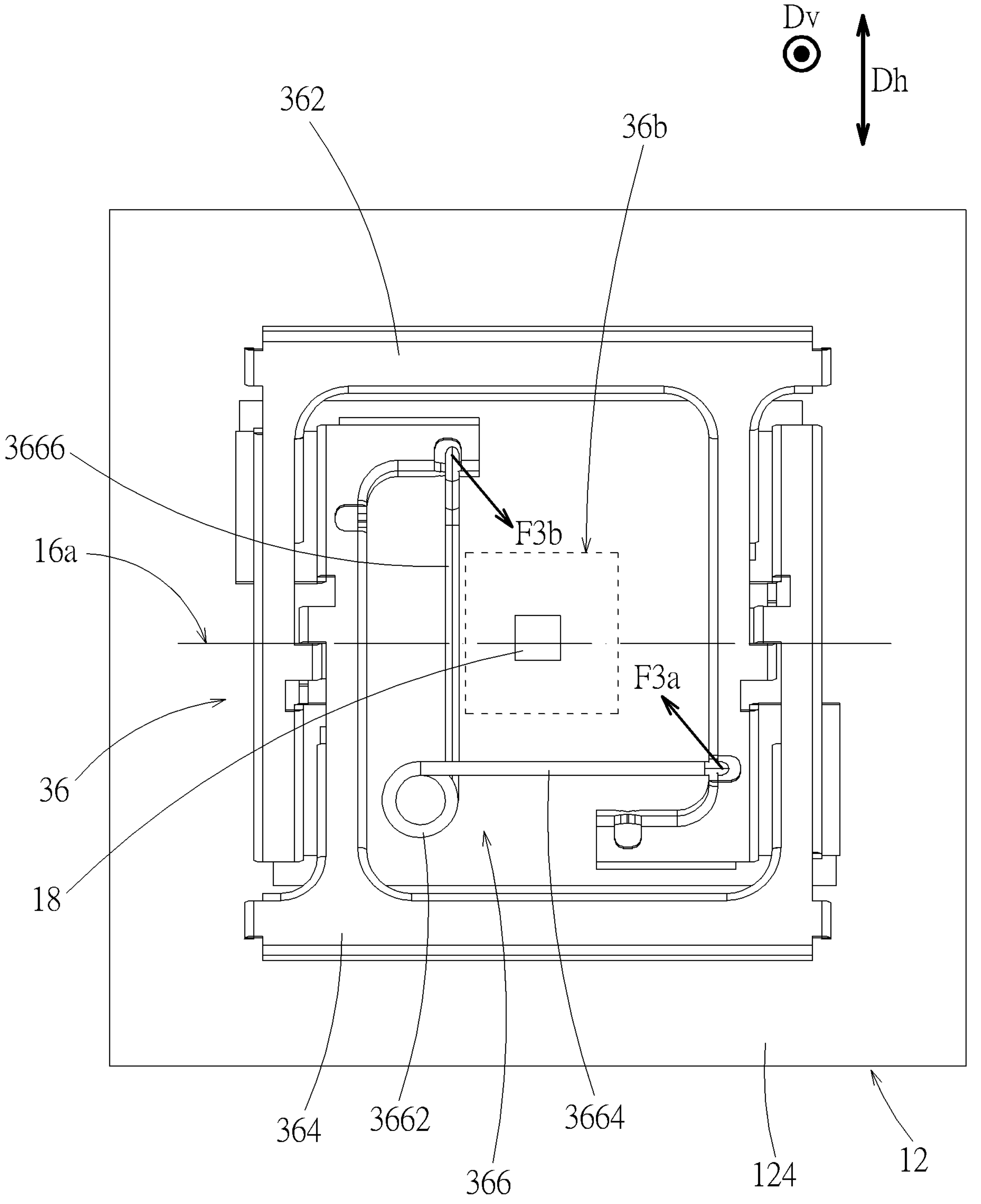
FIG. 21 is a top view of the lift mechanism in FIG. 18; therein, the keycap is not shown in this figure.

For another example, as shown by FIG. 18 to FIG. 21, a keyswitch structure 3 according to a fifth embodiment is similar in structure to the keyswitch structure 1 according to the first embodiment, and uses the reference numbers of the keyswitch structure 1. For other descriptions about components of the keyswitch structure 3, please refer to the relevant descriptions of the same named components of the keyswitch structure 1 and the variants thereof, which will not be described in addition. A main difference between the keyswitch structure 3 and the keyswitch structure 1 is that the spring structure 366 of the lift mechanism 36 of the keyswitch structure 3 is different in structure from the spring structure 166 of the lift mechanism 16 of the keyswitch structure 1. Furthermore, compared with the first support 162 and the second support 164 of the lift mechanism 16 of the keyswitch structure 1, the first support 362 and the second support 364 of the lift mechanism 36 is structurally modified to facilitate connecting with the spring structure 366. In practice, the spring structure 366 of the lift mechanism 36 may be realized by a wire (e.g., a metal wire) and includes a helical spring portion 3662 and a first support connecting portion 3664 and a second support connecting portion 3666 which extend from the helical spring portion 3662. The helical spring portion 3662 has a helical axis 3662*a* (indicated by a chain line in the figures) parallel to the vertical direction Dv. The spring structure 366 is connected to the first support 362 through the first support connecting portion 3664 and is connected to the second support 364 through the second support connecting portion 3666. Similarly, the spring structure 366 is connected to the first support 362 and the second support 364 in tension, so that the spring structure 366 can produce a restoring force to drive the first support 362 and the second support 364 to approach each other in the horizontal direction Dh (perpendicular to the vertical direction Dv and the rotation axis 26*a*), thereby lifting the keycap 14. Therein, the lift mechanism 36 as a whole defines a central space 36*b* (indicated by a dashed box in the figures), which extends through the whole lift mechanism 36 in the vertical direction Dv. The first support 362 and the second support 364 jointly surround the central space 36*b*. The spring structure 366 does not enter the central space 36*b* and extends around the central space 36*b*. When the keycap 14 is pressed, the first support 362 and the second support 364 stretch the whole spring structure 366 in the horizontal direction Dh (to twist the helical spring portion 3662). In the fifth embodiment, the first support connecting portion 3664, the helical spring portion 3662, and the second support connecting portion 3666 are arranged in an L shape (or the spring structure 366 as a whole is an L-shaped structure, and the helical spring portion 3662 is located at the corner of the L-shaped structure). The central space 36*b* is located outside the helical spring portion 3662. The helical spring portion 3662 can provide a torsion spring effect and can reduce the overall spring constant of the spring structure 366. Furthermore, as shown by FIG. 21, the L-shaped structure of the spring structure 366 extends parallel to the projections of the first support 362 and the second support 364. The spring structure 366 applies forces F3*a* and F3*b* to the first support 362 and the second support 364, respectively (as shown in FIG. 11). The forces F3*a* and F3*b* have the same magnitude and opposite directions. In the fifth embodiment, the spring structure 366 only applies force to the first support 362 and the second support 364 in a single place, so the forces F3*a* and F3*b* are also directly regarded as equivalent forces in logic. Although the forces F3*a* and F3*b* are not parallel to the horizontal direction Dh, they both pass through the central space 36*b*, which still helps to enhance the structural stability of the lift mechanism 36.

Figure 22:
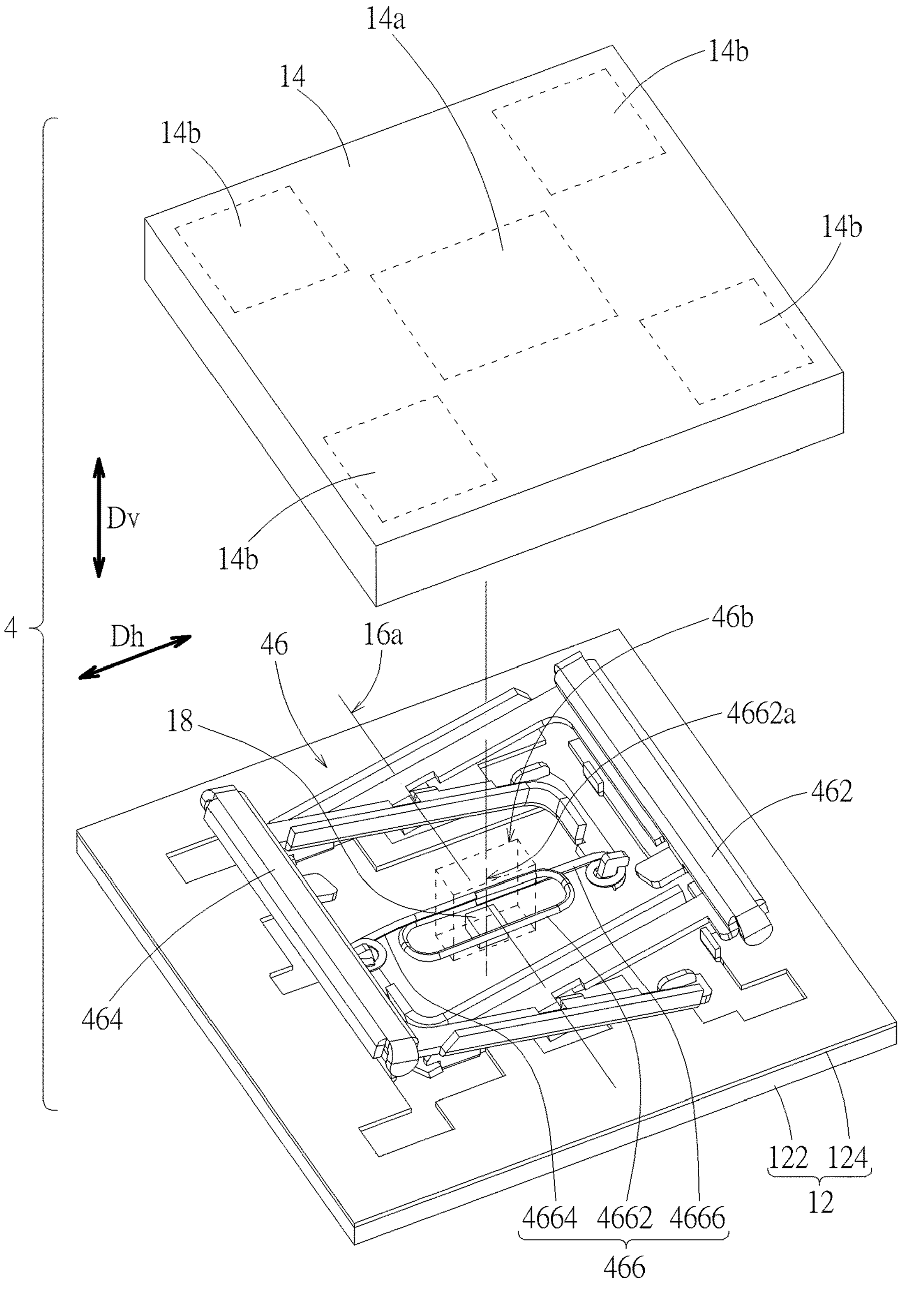
FIG. 22 is a partially exploded view of a keyswitch structure according to a sixth embodiment.
Figure 23:
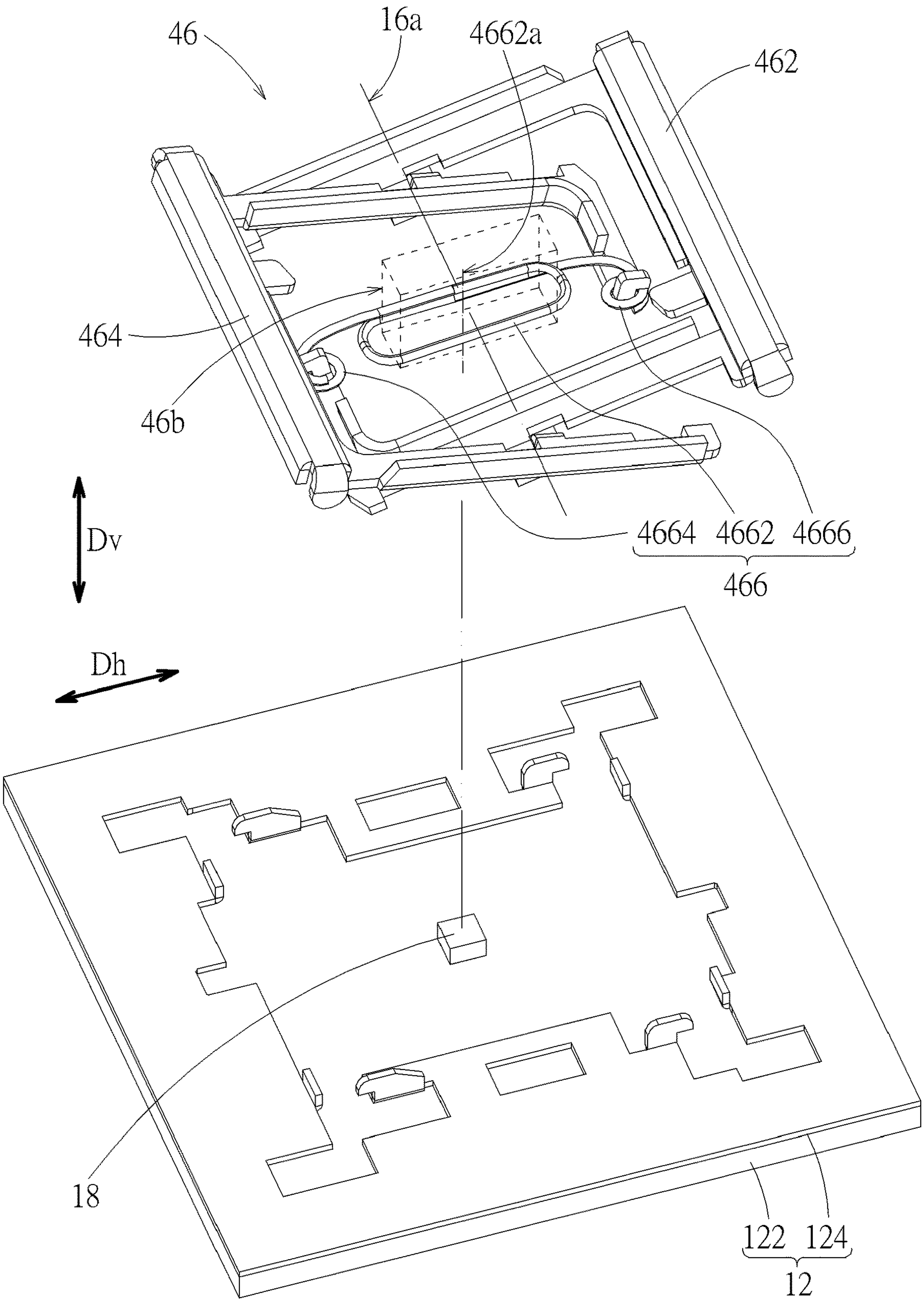
FIG. 23 is another partially exploded view of the keyswitch structure in FIG. 22; therein, the keycap is not shown in this figure.
Figure 24:
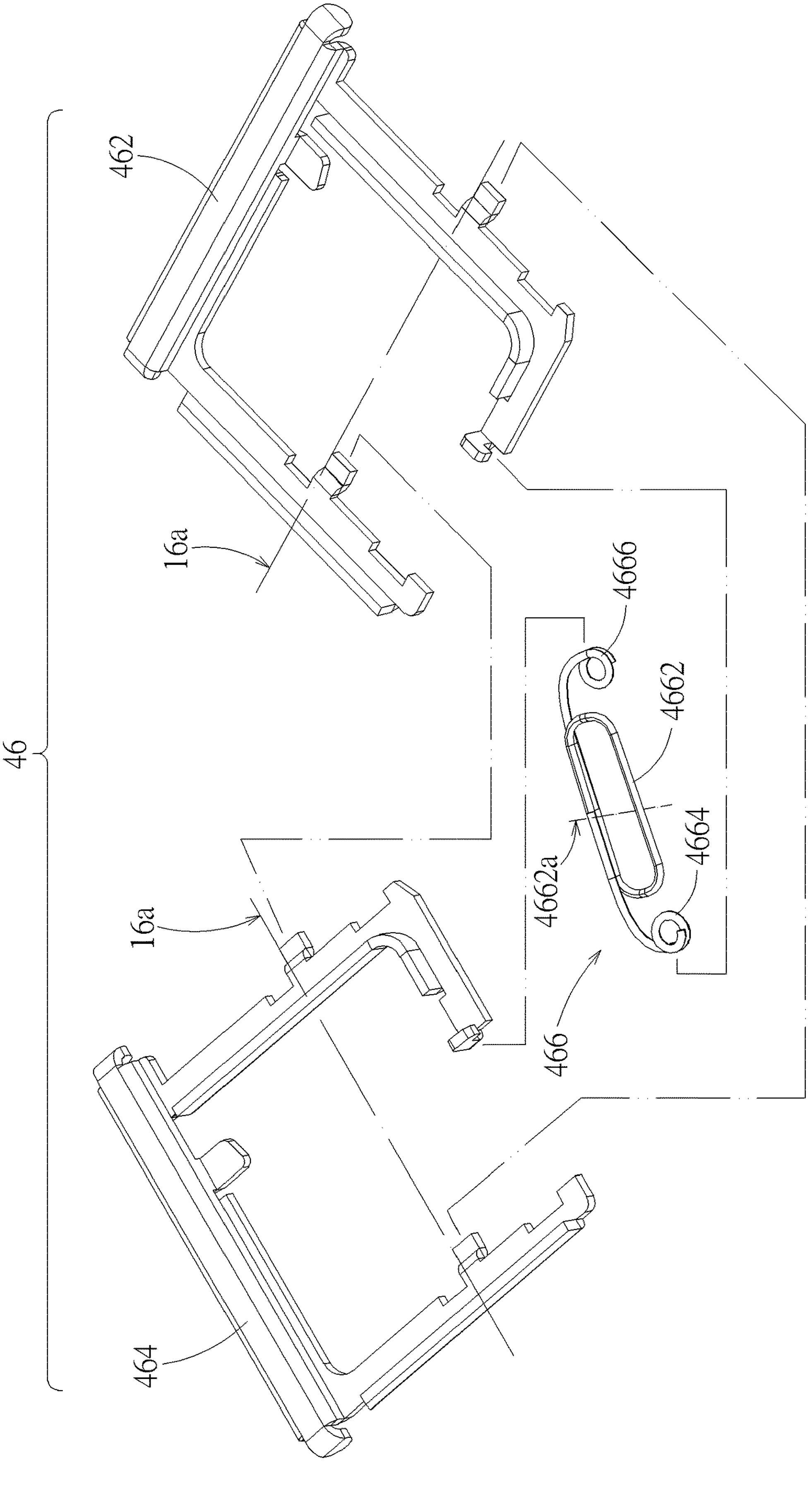
FIG. 24 is an exploded view of a lift mechanism in FIG. 23.

Please refer to FIG. 22 to FIG. 24. A keyswitch structure 4 according to a sixth embodiment is similar in structure to the keyswitch structure 3 according to the fifth embodiment, and uses the reference numbers of the keyswitch structure 3. For other descriptions about components of the keyswitch structure 4, please refer to the relevant descriptions of the keyswitch structure 3 and the variants thereof, which will not be described in addition. A main difference between the keyswitch structure 4 and the keyswitch structure 3 is that the spring structure 466 of the lift mechanism 46 of the keyswitch structure 4 as a whole is a long structure. Furthermore, compared with the lift mechanism 36 of the keyswitch structure 3, the first support 462 and the second support 464 of the lift mechanism 46 are structurally modified to adapt to the spring structure 466. The spring structure 466 includes a helical spring portion 4662 and a first support connecting portion 4664 and a second support connecting portion 4666 which extend from the helical spring portion 4662. The helical spring portion 4662 has a helical axis 4662*a* (indicated by a chain line in the figures) parallel to the vertical direction Dv. The first support connecting portion 4664, the helical spring portion 4662, and the second support connecting portion 4666 are arranged roughly in a straight line. The spring structure 466 is connected to the first support 462 and the second support 464 through the first support connecting portion 4664 and the second support connecting portion 4666, respectively. When the first support 462 and the second support 464 stretch the spring structure 466 in the horizontal direction Dh, the helical spring portion 4662 is elastically deformed. In the sixth embodiment, although the helical spring portion 4662 is located at the central portion from the view point of the vertical direction Dv, the lift mechanism 46 as a whole can still define a central space 46*b* (indicated by a dashed box in the figures) to adapt to the structure of the helical spring portion 4662, which extends and passes through the whole lift mechanism 46 in the vertical direction Dv. The central space 46*b* is located inside the helical spring portion 4662. Thereby, light emitted upward by the light-emitting part 18 (disposed on the base 12 corresponding to the central space 46*b*) can pass through the helical spring portion 4662 to illuminate the keycap 14.

Figure 25:
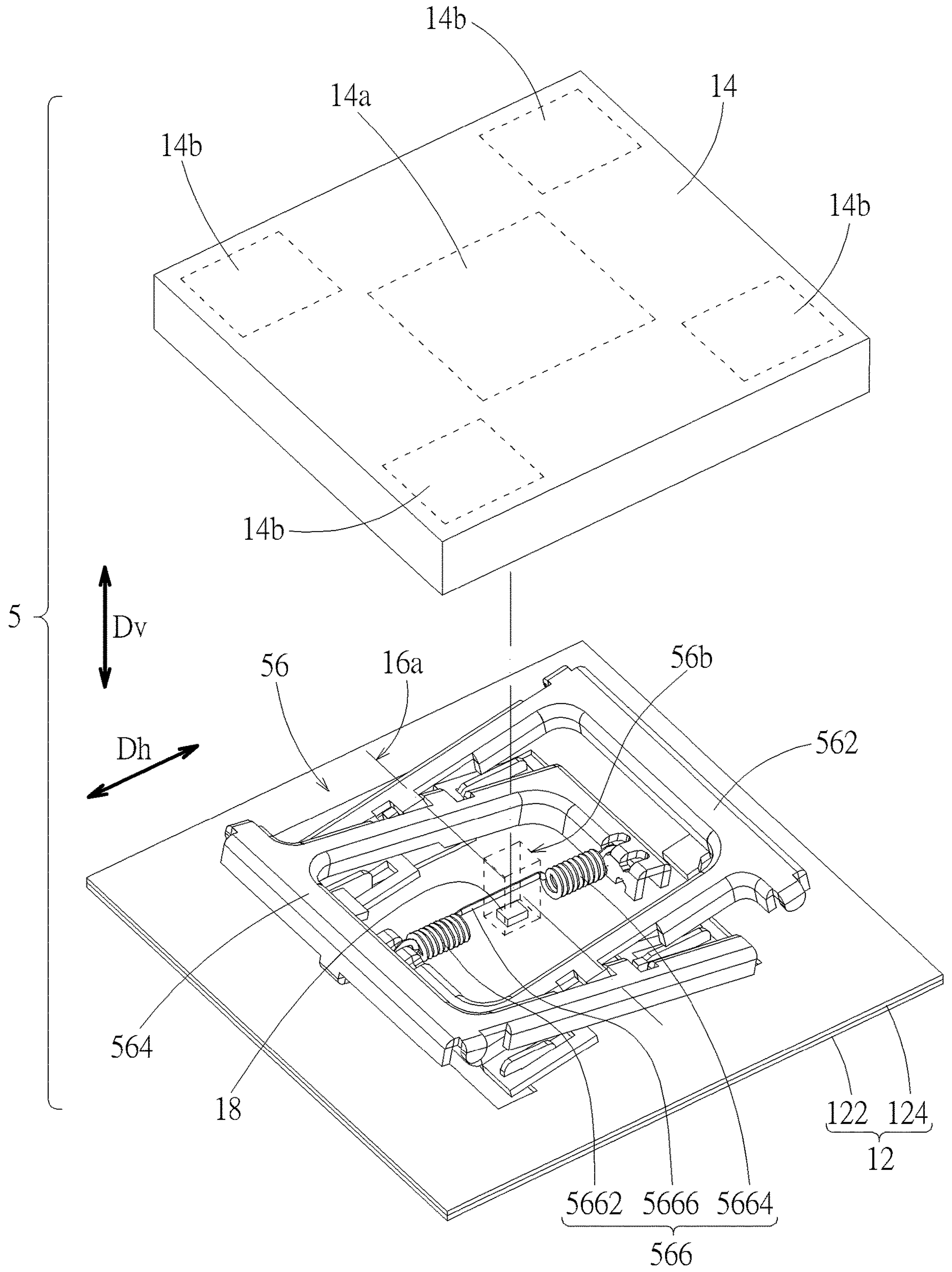
FIG. 25 is a partially exploded view of a keyswitch structure according to a seventh embodiment.
Figure 26:
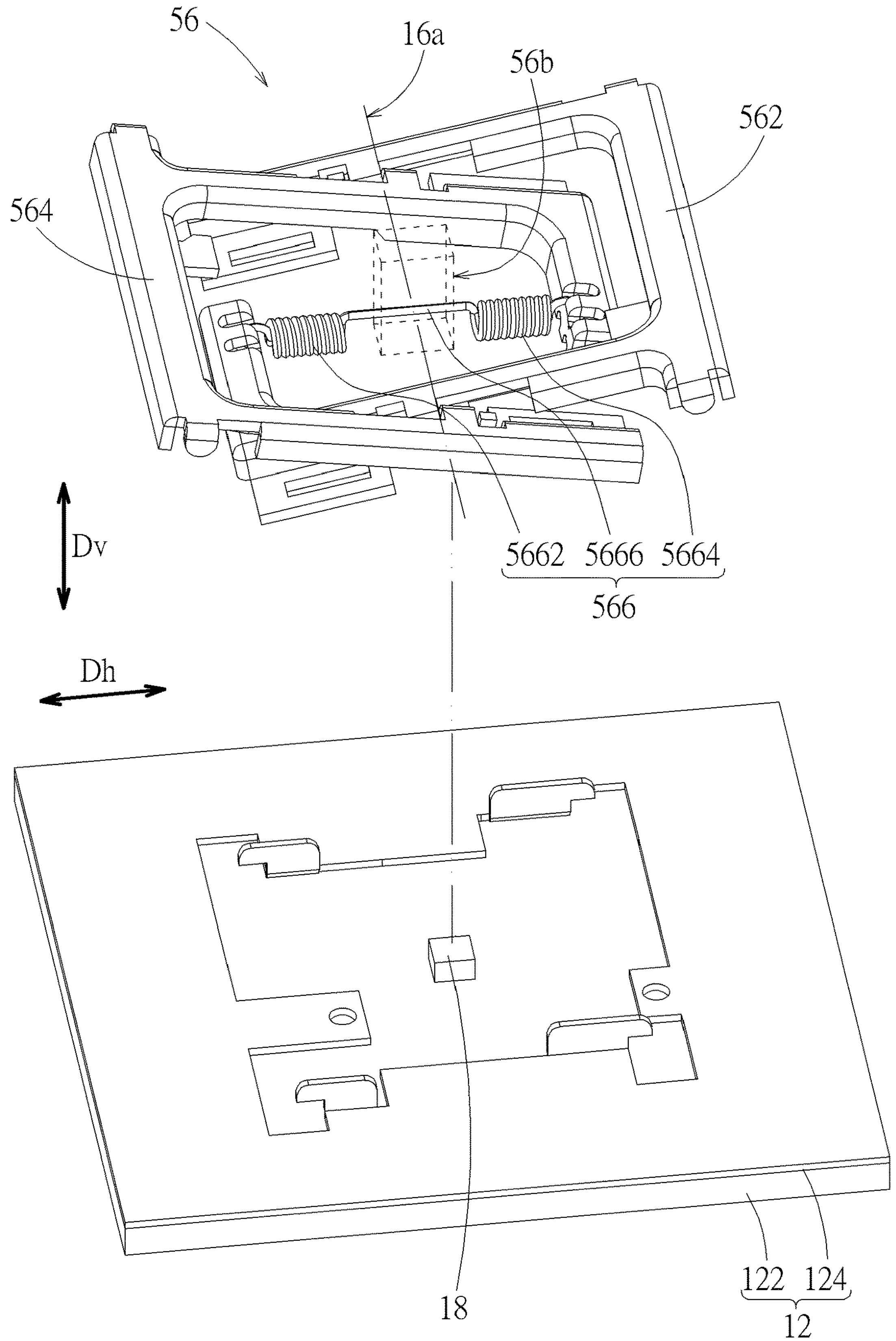
FIG. 26 is another partially exploded view of the keyswitch structure in FIG. 25; therein, the keycap is not shown in this figure.
Figure 27:
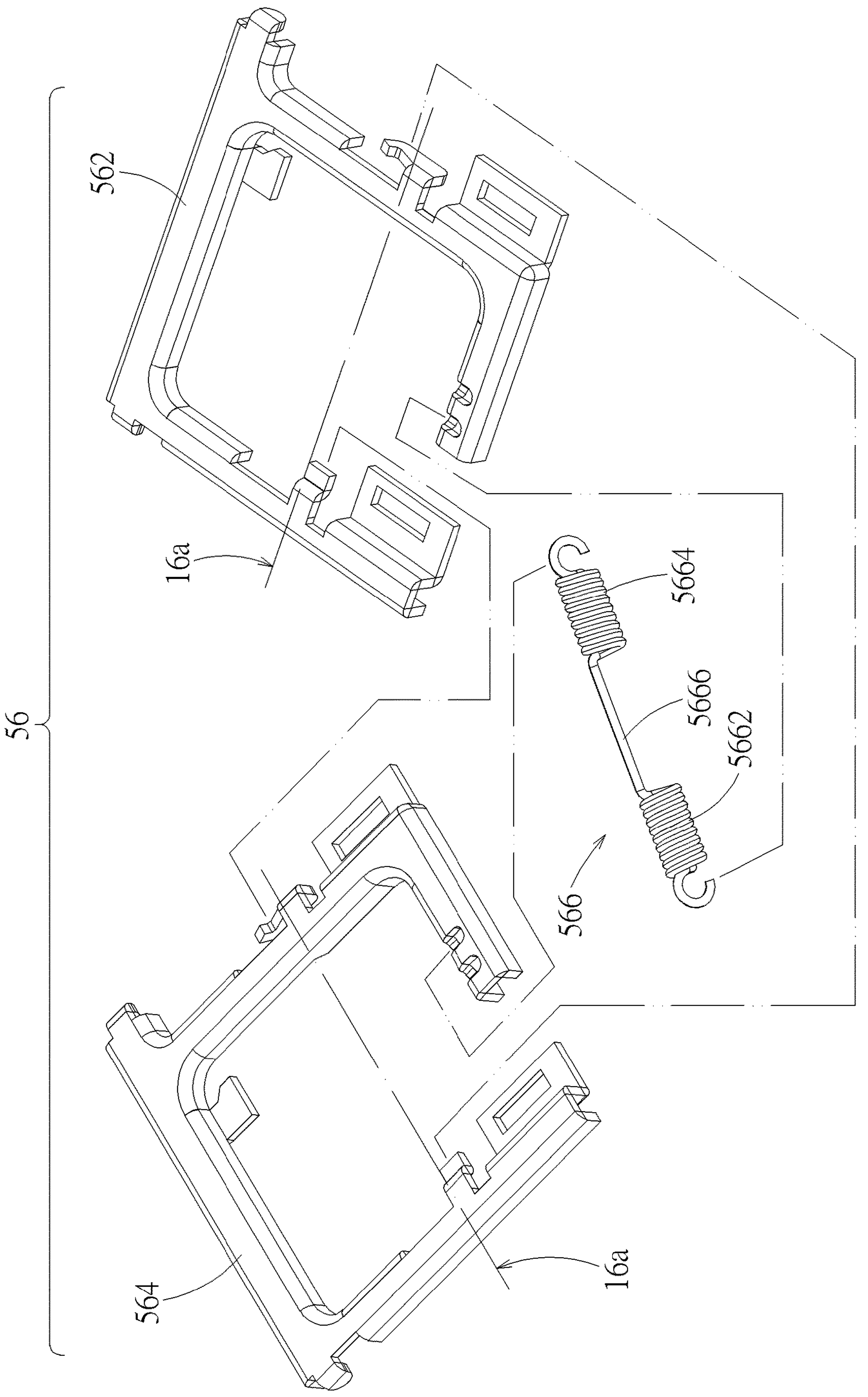
FIG. 27 is an exploded view of a lift mechanism in FIG. 26.

Please refer to FIG. 25 to FIG. 27. A keyswitch structure 5 according to a seventh embodiment is similar in structure to the keyswitch structure 4 according to the sixth embodiment, and uses the reference numbers of the keyswitch structure 4. For other descriptions about components of the keyswitch structure 5, please refer to the relevant descriptions of the same named components of the keyswitch structure 4 and the variants thereof, which will not be described in addition. A main difference between the keyswitch structure 5 and the keyswitch structure 4 is that the spring structure 566 of the lift mechanism 56 of the keyswitch structure 5 includes a first helical spring portion 5662, a second helical spring portion 5664, and a spring connecting portion 5666 connecting the first helical spring portion 5662 and the second helical spring portion 5664. The first helical spring portion 5662, the spring connecting portion 5666, and the second helical spring portion 5664 are arranged roughly in a straight line. The spring structure 566 is connected to the first support 562 of the lift mechanism 56 through an end of the first helical spring portion 5662 (i.e., the end of the first helical spring portion 5662 away from the second helical spring portion 5664), and is connected to the second support 564 of the lift mechanism 56 through an end of the second helical spring portion 5664 (i.e., the end of the second helical spring portion 5664 away from the first helical spring portion 5662). When the keycap 14 is pressed, the first support 562 and the second support 564 stretch the spring structure 566 (i.e., mainly stretching the first helical spring portion 5662 and the second helical spring portion 5664) in the horizontal direction Dh. In the seventh embodiment, although the spring connecting portion 5666 is located at the central portion of the lift mechanism 56, the lift mechanism 56 as a whole can still define a central space 56*b* (indicated by a dashed box in the figures) to adapt to the structure of the spring connecting portion 5666, which extends and passes through the whole lift mechanism 56 in the vertical direction Dv and avoids the spring connecting portion 5666. The first helical spring portion 5662 and the second helical spring portion 5664 are located on two opposite sides of the central space 56*b* (in the horizontal direction Dh). Thereby, light emitted upward by the light-emitting part 18 (disposed on the base 12 corresponding to the central space 56*b*) can avoid the spring connecting portion 5666 to illuminate the keycap 14.

Figure 28:
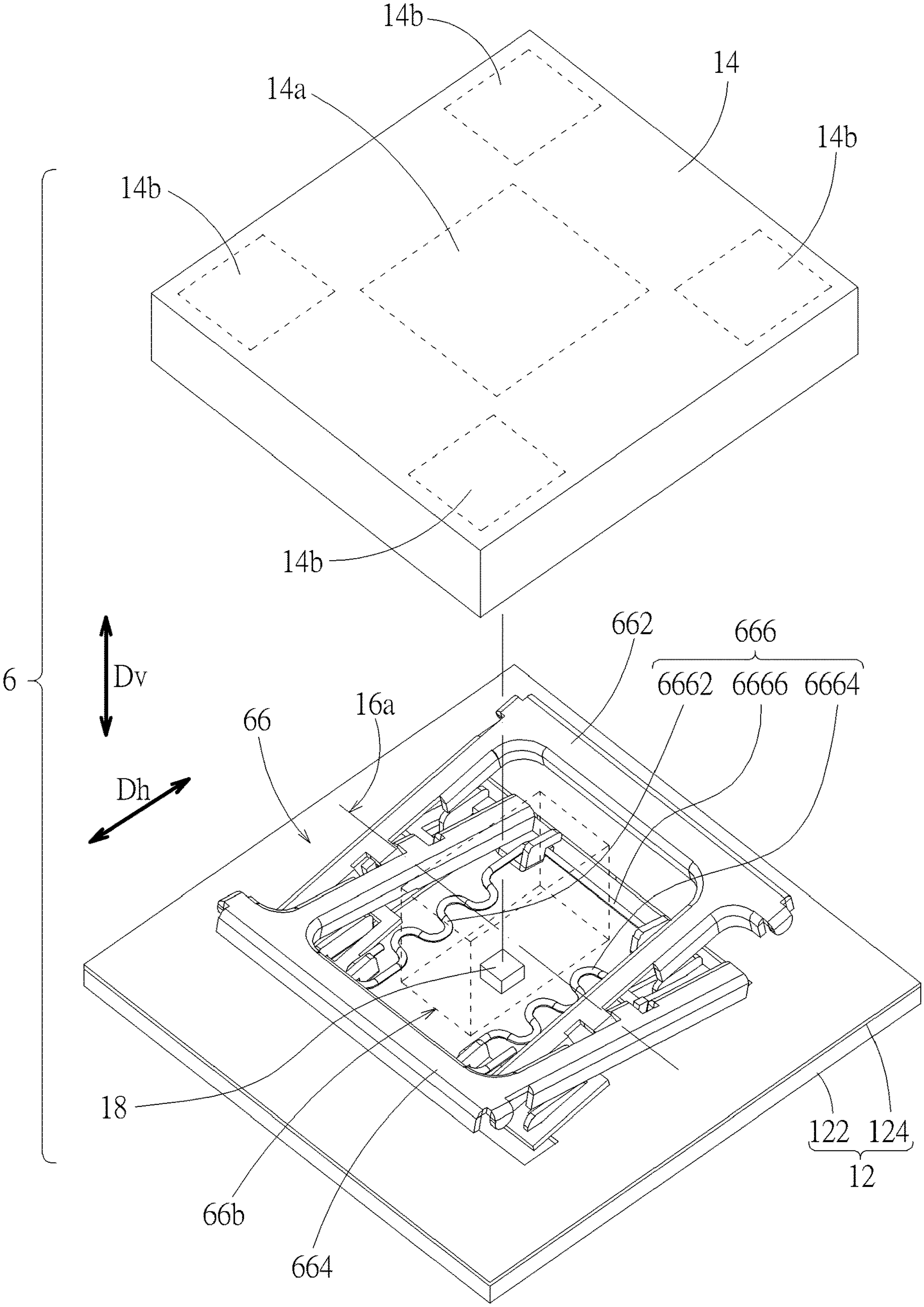
FIG. 28 is a partially exploded view of a keyswitch structure according to an eighth embodiment.
Figure 29:
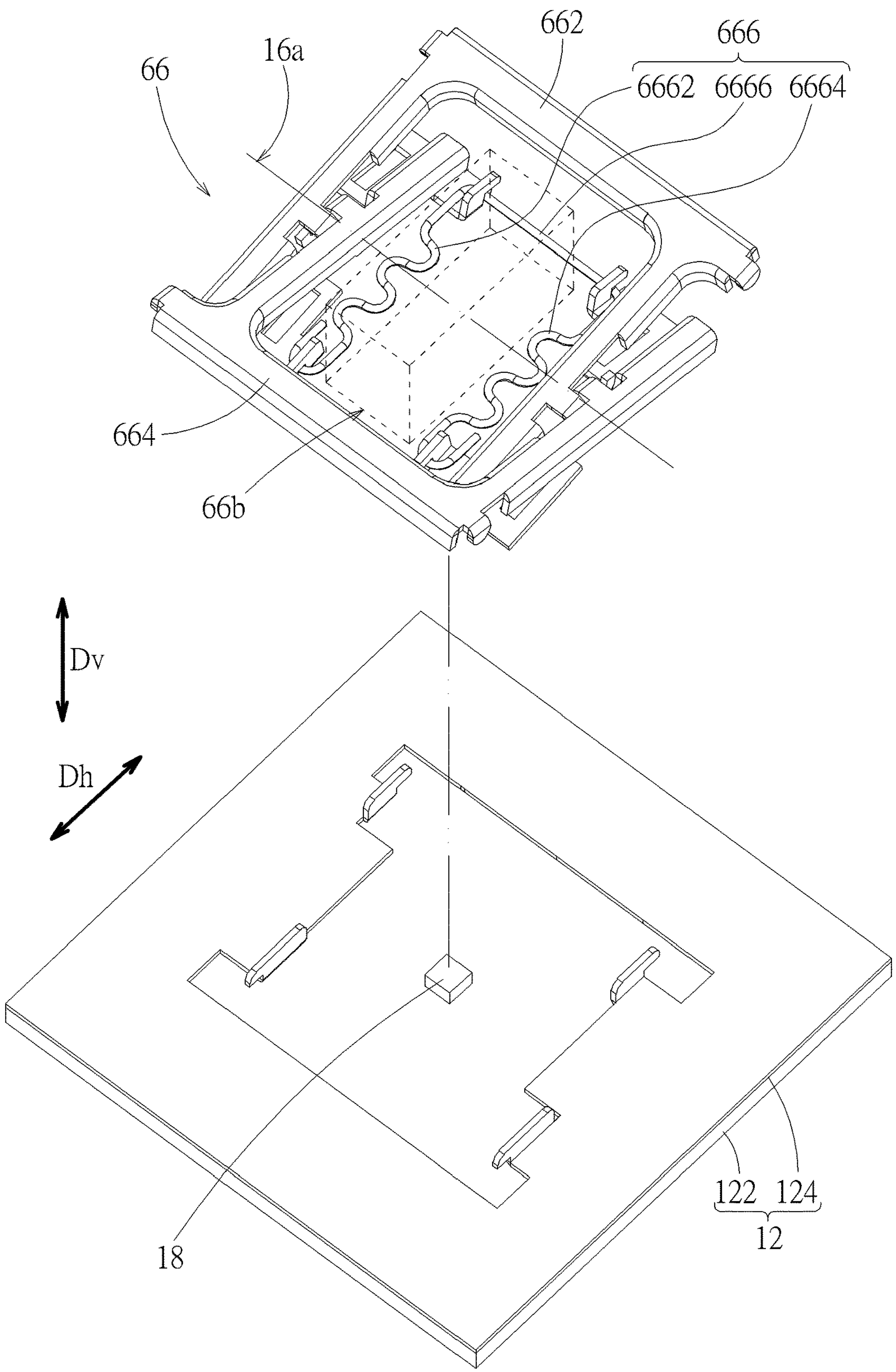
FIG. 29 is another partially exploded view of the keyswitch structure in FIG. 28; therein, the keycap is not shown in this figure.
Figure 30:
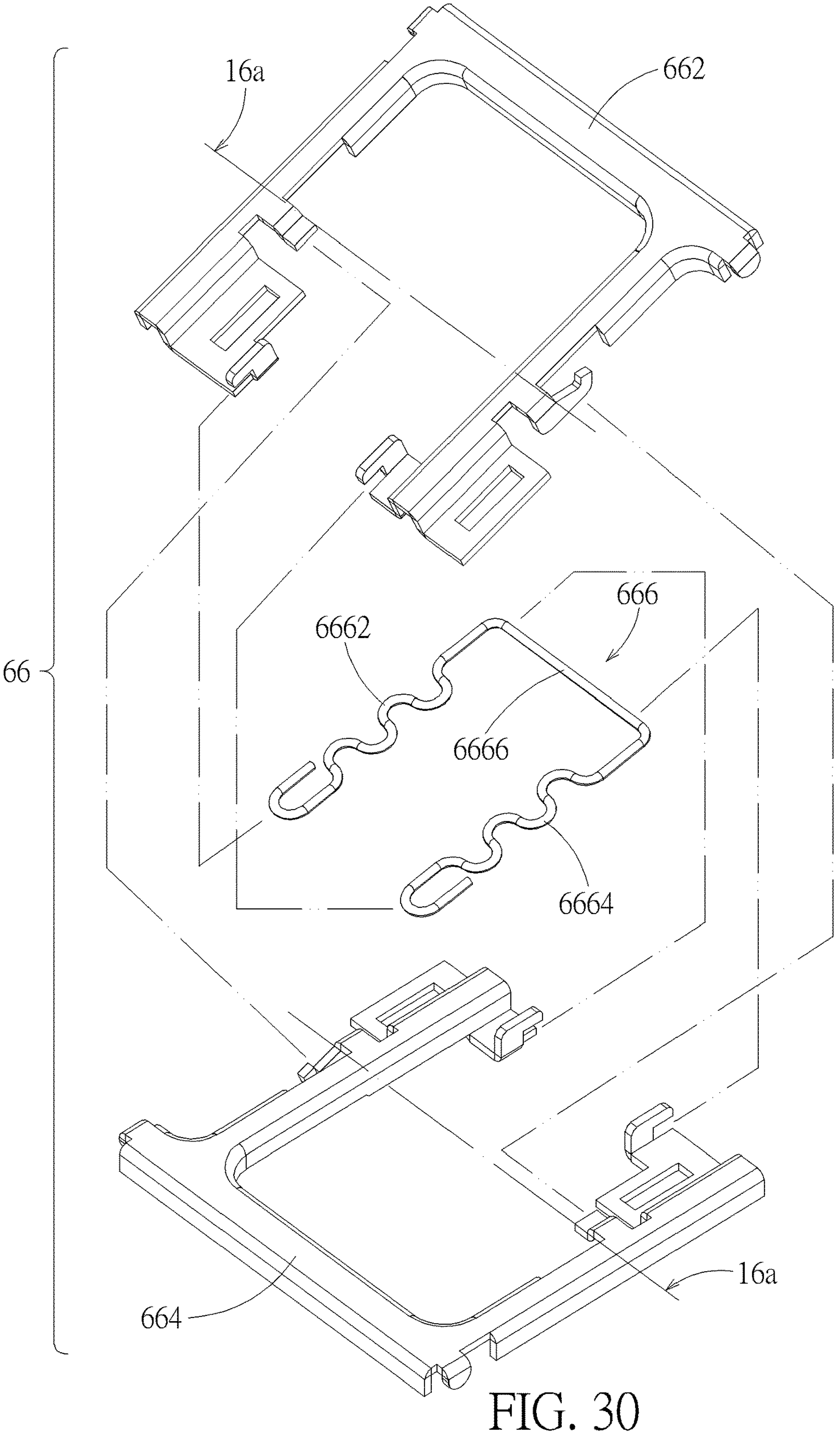
FIG. 30 is an exploded view of a lift mechanism in FIG. 29.

Please refer to FIG. 28 to FIG. 30. A keyswitch structure 6 according to an eighth embodiment is similar in structure to the keyswitch structure 1 according to the first embodiment, so for other descriptions about components of the keyswitch structure 6, please refer to the relevant descriptions of the same named components of the keyswitch structure 1 and the variants thereof, which will not be described in addition. A main difference between the keyswitch structure 6 and the keyswitch structure 1 is that the spring structure 666 of the lift mechanism 66 of the keyswitch structure 6 is different from the spring structure 166 of the lift mechanism 16 of the keyswitch structure 1. The spring structure 666 may be made of a wire (e.g., a metal wire) in practice, and includes a first elastic portion 6662, a second elastic portion 6664, and a connecting portion 6666 connecting the first elastic portion 6662 and the second elastic portion 6664. The first elastic portion 6662 is connected to the first support 162 and the second support 164 (of the lift mechanism 66). The second elastic portion 6664 is also connected to the first support 162 and the second support 164 (of the lift mechanism 66). The first elastic portion 6662 and the second elastic portion 6664 are located on two opposite sides of the central space 66*b* of the lift mechanism 66 in the horizontal direction Dh. When the keycap 14 is pressed, the first support 162 and the second support 164 stretch the spring structure 666 (i.e., mainly stretching the first elastic portion 6662 and the second elastic portion 6664) in the horizontal direction Dh. In the eighth embodiment, the first elastic portion 6662 and the second elastic portion 6664 are realized by coplanar curved structures; however, it is not limited thereto in practice. For example, the first elastic portion 6662 and the second elastic portion 6664 are realized by coil springs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lift mechanism for supporting a keycap in a vertical direction, the lift mechanism comprising:

a first support;

a second support, the first support and the second support being connected to each other and being mutually rotatable; and a spring structure, the spring structure being a single structural part and being connected to the first support and the second support, the spring structure driving the first support and the second support to lift the keycap in the vertical direction;

wherein the lift mechanism as a whole defines a central space, the central space extends through the whole lift mechanism in the vertical direction, and the spring structure does not enter the central space; and wherein an equivalent force of force exerted by the spring structure on the first support passes through the central space.

2. The lift mechanism according to claim 1, wherein the spring structure as a whole is a ring-shaped structure, surrounding the central space.

3. The lift mechanism according to claim 2, wherein the spring structure is a bent plate or wire.

4. The lift mechanism according to claim 2, wherein the spring structure is connected to at least one portion of the first support.

5. The lift mechanism according to claim 2, wherein the spring structure as a whole is a polygonal structure.

6. The lift mechanism according to claim 5, wherein the spring structure is a bent wire, and the spring structure has a helical spring portion in at least one corner.

7. The lift mechanism according to claim 1, wherein the spring structure as a whole is a C-shaped structure, extending around the central space.

8. The lift mechanism according to claim 7, wherein the spring structure is a bent wire, and the spring structure has a corner and has a helical spring portion at the corner.

9. The lift mechanism according to claim 1, wherein the spring structure comprises a helical spring portion, a first support connecting portion, and a second support connecting portion, the first support connecting portion and the second support connecting portion extend from the helical spring portion, the helical spring portion has a helical axis parallel to the vertical direction, the spring structure is connected to the first support through the first support connecting portion, and the spring structure is connected to the second support through the second support connecting portion.

10. The lift mechanism according to claim 9, wherein the central space is inside the helical spring portion.

11. The lift mechanism according to claim 9, wherein the first support connecting portion, the helical spring portion, and the second support connecting portion are arranged in an L-shape, and the central space is outside the helical spring portion.

12. The lift mechanism according to claim 1, wherein the spring structure comprises a first helical spring portion, a second helical spring portion, and a spring connecting portion connecting the first helical spring portion and the second helical spring portion, the first helical spring portion and the second helical spring portion are located on two opposite sides of the central space, the spring structure is connected to the first support through the first helical spring portion, and the spring structure is connected to the second support through the second helical spring portion.

13. The lift mechanism according to claim 1, wherein the spring structure comprises a first elastic portion, a second elastic portion, and a connecting portion connecting the first elastic portion and the second elastic portion, the first elastic portion is connected to the first support and the second support, the second elastic portion is connected to the first support and the second support, and the first elastic portion and the second elastic portion are located on two opposite sides of the central space.

14. The lift mechanism according to claim 1, wherein the first support has a first base connecting portion and a first keycap connecting portion, the second support has a second base connecting portion and a second keycap connecting portion, a distance between the first base connecting portion and a portion of the first support connecting with the spring structure is less than a distance between the first keycap connecting portion and the portion of the first support connecting with the spring structure, and a distance between the second base connecting portion and a portion of the second support connecting with the spring structure is less than a distance between the second keycap connecting portion and the portion of the second support connecting with the spring structure.

15. A key switch structure, comprising:

a base;

a keycap, the keycap being disposed above the base in a vertical direction;

a lift mechanism, the lift mechanism being connected to and between the base and the keycap, the lift mechanism comprising a first support, a second support, and a spring structure, the first support and the second support being connected to and between the base and the keycap, the first support and the second support being connected to each other and being mutually rotatable, the keycap being movable relative to the base in the vertical direction through the first support and the second support, the spring structure being a single structural part and being connected to the first support and the second support, the spring structure driving the first support and the second support to lift the keycap in the vertical direction, the lift mechanism as a whole defining a central space, the central space extending through the whole lift mechanism, the spring structure not entering the central space; and a light-emitting part, the light-emitting part being disposed on the base and within a projection of the central space on the base, the light-emitting part emitting light to illuminate the keycap;

wherein the first support has a first base connecting portion and a first keycap connecting portion, and a distance between the first base connecting portion and a portion of the first support connecting with the spring structure is less than a distance between the first keycap connecting portion and the portion of the first support connecting with the spring structure.

16. The keyswitch structure according to claim 15, wherein an equivalent force of force exerted by the spring structure on the first support passes through the central space.

17. The keyswitch structure according to claim 15, wherein the spring structure as a whole is a ring-shaped structure, surrounding the central space.

18. The keyswitch structure according to claim 15, wherein the spring structure as a whole is a C-shaped structure, extending around the central space.

19. The keyswitch structure according to claim 15, wherein the spring structure comprises a first elastic portion, a second elastic portion, and a connecting portion connecting the first elastic portion and the second elastic portion, the first elastic portion is connected to the first support and the second support, the second elastic portion is connected to the first support and the second support, and the first elastic portion and the second elastic portion are located on two opposite sides of the central space.

* * * * *